(12) United States Patent
Chun et al.

(10) Patent No.: US 9,100,896 B2
(45) Date of Patent: Aug. 4, 2015

(54) METHOD OF UPDATING REPEATEDLY-TRANSMITTED INFORMATION IN A WIRELESS COMMUNICATION SYSTEM

(75) Inventors: Sung Duck Chun, Gyeonggi-do (KR);
Young Dae Lee, Gyeonggi-do (KR);
Sung Jun Park, Gyeonggi-do (KR);
Seung June Yi, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 307 days.

(21) Appl. No.: 12/602,763

(22) PCT Filed: Jun. 17, 2008

(86) PCT No.: PCT/KR2008/003420
§ 371 (c)(1),
(2), (4) Date: Dec. 2, 2009

(87) PCT Pub. No.: WO2008/156288
PCT Pub. Date: Dec. 24, 2008

(65) Prior Publication Data
US 2010/0174809 A1 Jul. 8, 2010

Related U.S. Application Data

(60) Provisional application No. 60/944,785, filed on Jun. 18, 2007, provisional application No. 60/945,340, filed on Jun. 20, 2007.

(30) Foreign Application Priority Data

Aug. 16, 2007 (KR) .......................... 10-2007-0082382

(51) Int. Cl.
*G06F 15/177* (2006.01)
*H04W 48/08* (2009.01)

(52) U.S. Cl.
CPC .................................... *H04W 48/08* (2013.01)

(58) Field of Classification Search
CPC ....................................................... H04W 48/08
USPC ......................... 370/259, 312, 314, 321, 328; 455/424.1, 412.1; 709/221
See application file for complete search history.

(56) References Cited

U.S. PATENT DOCUMENTS

| 5,754,754 A | 5/1998 | Dudley et al. |
| 5,802,064 A | 9/1998 | Lieberman |

(Continued)

FOREIGN PATENT DOCUMENTS

| CN | 1314747 | 9/2001 |
| CN | 1339903 | 3/2002 |

(Continued)

OTHER PUBLICATIONS

ZTE, "Redundant Retransmission Restraint in RLC-AM," 3GPP TSG-RAN WG2 Meeting #53, R2-061234, May 8, 2006, XP-050131180.

(Continued)

*Primary Examiner* — Donald Mills
*Assistant Examiner* — Henry Baron
(74) *Attorney, Agent, or Firm* — Lee, Hong, Degerman, Kang & Waimey

(57) ABSTRACT

A method of updating repeatedly-transmitted information from a network to a user equipment in a wireless communication system is disclosed. The network transmits an indicator to the user equipment, the indicator indicating that repeatedly-transmitted information has been updated, and transmits the updated repeatedly-transmitted information to the user equipment in accordance with the indicator. The user equipment receives the updated repeatedly-transmitted information only if it receives an indicator from the network, the indicator indicating that the repeatedly-transmitted information has been updated.

16 Claims, 13 Drawing Sheets

(56) References Cited

U.S. PATENT DOCUMENTS

| | | | |
|---|---|---|---|
| 5,878,041 A | 3/1999 | Yamanaka et al. | |
| 6,445,917 B1 | 9/2002 | Bark et al. | |
| 6,557,135 B1 | 4/2003 | Balachandran et al. | |
| 6,594,240 B1 | 7/2003 | Chuah et al. | |
| 6,594,244 B1 | 7/2003 | Chang et al. | |
| 6,628,946 B1 | 9/2003 | Wiberg et al. | |
| 6,728,918 B1 | 4/2004 | Ikeda et al. | |
| 6,738,624 B1 | 5/2004 | Aksentijevic et al. | |
| 6,788,944 B2 | 9/2004 | Jiang | |
| 6,862,450 B2 | 3/2005 | Mikola et al. | |
| 6,874,113 B2 | 3/2005 | Chao et al. | |
| 6,967,936 B1 | 11/2005 | Laroia et al. | |
| 6,987,985 B2 | 1/2006 | Purkayastha et al. | |
| 7,009,940 B2 | 3/2006 | Vialen et al. | |
| 7,171,163 B2 | 1/2007 | Terry et al. | |
| 7,180,885 B2 | 2/2007 | Terry | |
| 7,227,857 B2 | 6/2007 | Kuo | |
| 7,227,868 B2 | 6/2007 | Inden | |
| 7,295,573 B2 | 11/2007 | Yi et al. | |
| 7,313,116 B2 | 12/2007 | Lee et al. | |
| 7,400,593 B2 | 7/2008 | Choi et al. | |
| 7,450,933 B2 * | 11/2008 | Kwak et al. | 455/414.1 |
| 7,486,699 B2 | 2/2009 | Yi et al. | |
| 7,525,908 B2 | 4/2009 | Olsson et al. | |
| 7,706,410 B2 | 4/2010 | Chun et al. | |
| 7,710,930 B2 | 5/2010 | Kwak | |
| 7,796,505 B2 | 9/2010 | Olsson et al. | |
| 7,817,595 B2 | 10/2010 | Wu | |
| 7,876,771 B2 | 1/2011 | Bergstrom et al. | |
| 7,894,444 B2 | 2/2011 | Lohr et al. | |
| 7,978,616 B2 | 7/2011 | Chun et al. | |
| 8,027,321 B2 | 9/2011 | Zheng | |
| 8,027,363 B2 | 9/2011 | Chun et al. | |
| 8,031,689 B2 | 10/2011 | Guo | |
| 8,059,597 B2 | 11/2011 | Park et al. | |
| 8,081,662 B2 | 12/2011 | Chun et al. | |
| 8,130,687 B2 | 3/2012 | Cai et al. | |
| 8,160,012 B2 | 4/2012 | Chun et al. | |
| 8,190,144 B2 | 5/2012 | Chun et al. | |
| 8,203,988 B2 | 6/2012 | Chun et al. | |
| 8,243,931 B2 | 8/2012 | Yi et al. | |
| 8,270,361 B2 | 9/2012 | Yi et al. | |
| 8,335,189 B2 | 12/2012 | Wang et al. | |
| 8,699,711 B2 | 4/2014 | Mukherjee et al. | |
| 8,712,055 B2 | 4/2014 | Yi et al. | |
| 8,797,956 B2 | 8/2014 | Hapsari et al. | |
| 8,989,382 B2 | 3/2015 | Yi et al. | |
| 2002/0001314 A1 | 1/2002 | Yi et al. | |
| 2002/0009999 A1 | 1/2002 | Lee et al. | |
| 2002/0024972 A1 | 2/2002 | Yi et al. | |
| 2002/0114280 A1 | 8/2002 | Yi et al. | |
| 2002/0122411 A1 | 9/2002 | Zimmerman et al. | |
| 2003/0007490 A1 | 1/2003 | Yi et al. | |
| 2003/0099305 A1 | 5/2003 | Yi et al. | |
| 2003/0194992 A1 | 10/2003 | Kim et al. | |
| 2004/0003106 A1 | 1/2004 | Cunningham et al. | |
| 2004/0008659 A1 | 1/2004 | Kim | |
| 2004/0022213 A1 | 2/2004 | Choi et al. | |
| 2004/0076182 A1 | 4/2004 | Wu | |
| 2004/0103435 A1 | 5/2004 | Yi et al. | |
| 2004/0117860 A1 | 6/2004 | Yi et al. | |
| 2004/0146019 A1 | 7/2004 | Kim et al. | |
| 2004/0147236 A1 | 7/2004 | Parkvall et al. | |
| 2004/0148396 A1 | 7/2004 | Meyer et al. | |
| 2004/0153852 A1 | 8/2004 | Wu | |
| 2004/0156330 A1 | 8/2004 | Yi et al. | |
| 2004/0184438 A1 | 9/2004 | Terry | |
| 2004/0208160 A1 | 10/2004 | Petrovic et al. | |
| 2004/0223507 A1 | 11/2004 | Kuchibhotla et al. | |
| 2004/0229626 A1 | 11/2004 | Yi et al. | |
| 2004/0235447 A1 | 11/2004 | Gronberg et al. | |
| 2005/0020260 A1 | 1/2005 | Jeong et al. | |
| 2005/0026597 A1 | 2/2005 | Kim et al. | |
| 2005/0039101 A1 | 2/2005 | Torsner | |
| 2005/0041663 A1 | 2/2005 | Jiang | |
| 2005/0041681 A1 | 2/2005 | Lee et al. | |
| 2005/0042987 A1 | 2/2005 | Lee et al. | |
| 2005/0047416 A1 | 3/2005 | Heo et al. | |
| 2005/0054365 A1 | 3/2005 | Ahn et al. | |
| 2005/0063347 A1 | 3/2005 | Sarkkinen et al. | |
| 2005/0083943 A1 | 4/2005 | Lee et al. | |
| 2005/0094596 A1 | 5/2005 | Pietraski et al. | |
| 2005/0096017 A1 | 5/2005 | Kim | |
| 2005/0100048 A1 | 5/2005 | Chun et al. | |
| 2005/0105499 A1 | 5/2005 | Shinozaki et al. | |
| 2005/0118992 A1 | 6/2005 | Jeong et al. | |
| 2005/0147040 A1 | 7/2005 | Vayanos et al. | |
| 2005/0164683 A1 | 7/2005 | Roberts et al. | |
| 2005/0169293 A1 | 8/2005 | Zhang et al. | |
| 2005/0192021 A1 | 9/2005 | Lee et al. | |
| 2005/0193309 A1 | 9/2005 | Grilli et al. | |
| 2005/0195852 A1 * | 9/2005 | Vayanos et al. | 370/437 |
| 2005/0201354 A1 | 9/2005 | Hosaka et al. | |
| 2005/0213605 A1 | 9/2005 | Kim et al. | |
| 2005/0237932 A1 | 10/2005 | Liu | |
| 2005/0237960 A1 | 10/2005 | Kim | |
| 2005/0237972 A1 | 10/2005 | Van Dervelde et al. | |
| 2005/0238051 A1 | 10/2005 | Yi et al. | |
| 2005/0249141 A1 | 11/2005 | Lee et al. | |
| 2005/0250526 A1 | 11/2005 | Lindoff et al. | |
| 2005/0254467 A1 | 11/2005 | Li et al. | |
| 2005/0259662 A1 | 11/2005 | Kim et al. | |
| 2005/0286483 A1 | 12/2005 | Lee et al. | |
| 2005/0287957 A1 | 12/2005 | Lee et al. | |
| 2006/0007886 A1 | 1/2006 | Lee et al. | |
| 2006/0030342 A1 | 2/2006 | Hwang et al. | |
| 2006/0056441 A1 | 3/2006 | Jiang | |
| 2006/0067238 A1 | 3/2006 | Olsson et al. | |
| 2006/0067289 A1 | 3/2006 | Lee et al. | |
| 2006/0067364 A1 | 3/2006 | Jung et al. | |
| 2006/0072494 A1 | 4/2006 | Matusz | |
| 2006/0072503 A1 | 4/2006 | Kim et al. | |
| 2006/0084389 A1 | 4/2006 | Beale et al. | |
| 2006/0092972 A1 | 5/2006 | Petrovic et al. | |
| 2006/0098574 A1 | 5/2006 | Yi et al. | |
| 2006/0128312 A1 | 6/2006 | Declerck et al. | |
| 2006/0142020 A1 | 6/2006 | Mueckenheim et al. | |
| 2006/0154603 A1 | 7/2006 | Sachs et al. | |
| 2006/0154680 A1 | 7/2006 | Kroth et al. | |
| 2006/0165045 A1 | 7/2006 | Kim et al. | |
| 2006/0182065 A1 | 8/2006 | Petrovic et al. | |
| 2006/0203780 A1 | 9/2006 | Terry | |
| 2006/0233200 A1 | 10/2006 | Fifield et al. | |
| 2006/0251027 A1 | 11/2006 | Chun et al. | |
| 2006/0251105 A1 | 11/2006 | Kim et al. | |
| 2006/0264179 A1 | 11/2006 | Bonneville et al. | |
| 2006/0268798 A1 | 11/2006 | Kim et al. | |
| 2006/0274690 A1 | 12/2006 | Chun et al. | |
| 2006/0280145 A1 | 12/2006 | Revel et al. | |
| 2006/0281456 A1 | 12/2006 | Roberts et al. | |
| 2007/0041397 A1 | 2/2007 | Hwang | |
| 2007/0047452 A1 | 3/2007 | Lohr et al. | |
| 2007/0047493 A1 | 3/2007 | Park et al. | |
| 2007/0053309 A1 | 3/2007 | Poojary et al. | |
| 2007/0060139 A1 | 3/2007 | Kim et al. | |
| 2007/0079207 A1 | 4/2007 | Seidel et al. | |
| 2007/0081468 A1 | 4/2007 | Timus | |
| 2007/0081513 A1 | 4/2007 | Torsner | |
| 2007/0091810 A1 | 4/2007 | Kim et al. | |
| 2007/0097913 A1 | 5/2007 | Hanov | |
| 2007/0117579 A1 | 5/2007 | Cai et al. | |
| 2007/0133456 A1 | 6/2007 | Ding | |
| 2007/0177628 A1 | 8/2007 | Choi et al. | |
| 2007/0178878 A1 | 8/2007 | Ding | |
| 2007/0183358 A1 | 8/2007 | Cai | |
| 2007/0189205 A1 | 8/2007 | Terry et al. | |
| 2007/0201397 A1 | 8/2007 | Zhang | |
| 2007/0206530 A1 | 9/2007 | Lee et al. | |
| 2007/0206531 A1 | 9/2007 | Pajukoski et al. | |
| 2007/0223526 A1 | 9/2007 | Jiang | |
| 2007/0258591 A1 | 11/2007 | Terry et al. | |
| 2007/0268861 A1 | 11/2007 | Diachina et al. | |
| 2007/0274278 A1 | 11/2007 | Choi et al. | |
| 2007/0287440 A1 | 12/2007 | Benkert et al. | |

(56) References Cited

U.S. PATENT DOCUMENTS

| | | |
|---|---|---|
| 2007/0297360 A1 | 12/2007 | Joachim et al. |
| 2007/0297367 A1 | 12/2007 | Wang et al. |
| 2008/0002688 A1 | 1/2008 | Kim et al. |
| 2008/0008152 A1 | 1/2008 | Lohr et al. |
| 2008/0013521 A1 | 1/2008 | Rangan et al. |
| 2008/0043658 A1 | 2/2008 | Worrall |
| 2008/0043670 A1 | 2/2008 | Marinier |
| 2008/0045224 A1 | 2/2008 | Lu et al. |
| 2008/0045272 A1 | 2/2008 | Wang et al. |
| 2008/0049682 A1 | 2/2008 | Ding et al. |
| 2008/0051098 A1 | 2/2008 | Rao |
| 2008/0059859 A1 | 3/2008 | Marinier et al. |
| 2008/0069108 A1 | 3/2008 | Yi et al. |
| 2008/0081598 A1 | 4/2008 | Chandra et al. |
| 2008/0084851 A1 | 4/2008 | Kim et al. |
| 2008/0089285 A1 | 4/2008 | Pirskanen et al. |
| 2008/0101609 A1 | 5/2008 | Jiang |
| 2008/0146242 A1 | 6/2008 | Alanara et al. |
| 2008/0165717 A1 | 7/2008 | Chen et al. |
| 2008/0165755 A1 | 7/2008 | Marinier et al. |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0186946 A1 | 8/2008 | Marinier et al. |
| 2008/0198869 A1 | 8/2008 | Jiang |
| 2008/0212561 A1 | 9/2008 | Pani et al. |
| 2008/0212605 A1 | 9/2008 | Jiang |
| 2008/0232396 A1 | 9/2008 | Buckley et al. |
| 2008/0233940 A1 | 9/2008 | Jen |
| 2008/0233941 A1 | 9/2008 | Jen |
| 2008/0261581 A1 | 10/2008 | Cai |
| 2008/0268878 A1 | 10/2008 | Wang et al. |
| 2008/0273482 A1 | 11/2008 | Lee et al. |
| 2008/0273610 A1 | 11/2008 | Malladi et al. |
| 2008/0318578 A1 | 12/2008 | Worrall |
| 2009/0005058 A1 | 1/2009 | Kazmi et al. |
| 2009/0016301 A1 | 1/2009 | Sammour et al. |
| 2009/0041240 A1 | 2/2009 | Parkvall et al. |
| 2009/0046631 A1 | 2/2009 | Meylan et al. |
| 2009/0046667 A1 | 2/2009 | Pelletier et al. |
| 2009/0046695 A1 | 2/2009 | Jiang |
| 2009/0104890 A1 | 4/2009 | Wang et al. |
| 2009/0116434 A1 | 5/2009 | Lohr et al. |
| 2009/0119564 A1 | 5/2009 | Sagfors et al. |
| 2009/0156194 A1 | 6/2009 | Meylan |
| 2009/0175163 A1 | 7/2009 | Sammour et al. |
| 2009/0190480 A1 | 7/2009 | Sammour et al. |
| 2009/0232076 A1 | 9/2009 | Kuo |
| 2009/0259908 A1 | 10/2009 | Gollapudi |
| 2009/0305712 A1 | 12/2009 | Franceschini et al. |
| 2009/0318177 A1* | 12/2009 | Wang et al. ............ 455/515 |
| 2009/0323574 A1 | 12/2009 | Koskinen et al. |
| 2010/0014466 A1 | 1/2010 | Meyer et al. |
| 2010/0091750 A1* | 4/2010 | Lee et al. .............. 370/338 |
| 2010/0128648 A1 | 5/2010 | Lee et al. |
| 2010/0142429 A1* | 6/2010 | Yi et al. ............... 370/312 |
| 2010/0142457 A1 | 6/2010 | Chun et al. |
| 2010/0157904 A1 | 6/2010 | Ho et al. |
| 2010/0232335 A1 | 9/2010 | Lee et al. |
| 2010/0260140 A1 | 10/2010 | Zhu |
| 2011/0019604 A1 | 1/2011 | Chun et al. |
| 2011/0033048 A1 | 2/2011 | Stanwood et al. |
| 2011/0305182 A1* | 12/2011 | Suzuki et al. .......... 370/311 |
| 2013/0258919 A1* | 10/2013 | Damnjanovic ......... 370/311 |

FOREIGN PATENT DOCUMENTS

| | | |
|---|---|---|
| CN | 1349360 | 5/2002 |
| CN | 1390425 | 1/2003 |
| CN | 1396780 | 2/2003 |
| CN | 1549610 | 11/2004 |
| CN | 1613210 | 5/2005 |
| CN | 1642067 | 7/2005 |
| CN | 1643820 | 7/2005 |
| CN | 1761260 | 4/2006 |
| CN | 1761356 | 4/2006 |
| CN | 1792048 | 6/2006 |
| CN | 1846365 | 10/2006 |
| CN | 1868157 | 11/2006 |
| CN | 1918825 | 2/2007 |
| CN | 1938969 | 3/2007 |
| CN | 1954521 | 4/2007 |
| CN | 1997227 | 7/2007 |
| CN | 101047966 | 10/2007 |
| CN | 101090281 | 12/2007 |
| EP | 1035745 | 9/2000 |
| EP | 1263160 | 12/2002 |
| EP | 1326397 | 7/2003 |
| EP | 1343267 | 9/2003 |
| EP | 1458148 | 9/2004 |
| EP | 1508992 | 2/2005 |
| EP | 1509011 | 2/2005 |
| EP | 1557967 | 7/2005 |
| EP | 1578111 | 9/2005 |
| EP | 1638237 | 3/2006 |
| EP | 1655879 | 5/2006 |
| EP | 1689130 | 8/2006 |
| EP | 1746855 | 1/2007 |
| EP | 1768297 | 3/2007 |
| EP | 01796405 | 6/2007 |
| EP | 1796405 | 6/2007 |
| EP | 2026523 | 2/2009 |
| JP | 06-053921 | 2/1994 |
| JP | 07162948 | 6/1995 |
| JP | 2000324161 | 11/2000 |
| JP | 2001197021 | 7/2001 |
| JP | 2002198895 | 7/2002 |
| JP | 2003018050 | 1/2003 |
| JP | 2003-115796 | 4/2003 |
| JP | 2003115876 | 4/2003 |
| JP | 2003229925 | 8/2003 |
| JP | 2003283592 | 10/2003 |
| JP | 2005073276 | 3/2005 |
| JP | 2006054718 | 2/2006 |
| JP | 2006505209 | 2/2006 |
| JP | 2006514466 | 4/2006 |
| JP | 2006121562 | 5/2006 |
| JP | 2006311543 | 11/2006 |
| JP | 2007116639 | 5/2007 |
| JP | 2007312244 | 11/2007 |
| JP | 2008520125 | 6/2008 |
| JP | 2009521893 | 6/2009 |
| JP | 2010-518683 | 5/2010 |
| KR | 1020010045783 | 6/2001 |
| KR | 1020010062306 | 7/2001 |
| KR | 1020020004645 | 1/2002 |
| KR | 1020020097304 | 12/2002 |
| KR | 1020030012048 | 2/2003 |
| KR | 1020030060055 | 7/2003 |
| KR | 1020030068743 | 8/2003 |
| KR | 10-2004-0016065 | 2/2004 |
| KR | 10-2004-0016334 | 2/2004 |
| KR | 1020040034398 | 4/2004 |
| KR | 1020040039944 | 5/2004 |
| KR | 1020040072961 | 8/2004 |
| KR | 10-2005-0029395 | 3/2005 |
| KR | 1020050022988 | 3/2005 |
| KR | 1020050062359 | 6/2005 |
| KR | 1020050081836 | 8/2005 |
| KR | 1020050092874 | 9/2005 |
| KR | 1020050099472 | 10/2005 |
| KR | 1020050100882 | 10/2005 |
| KR | 1020060004935 | 1/2006 |
| KR | 1020060014910 | 2/2006 |
| KR | 10-2006-0029452 | 4/2006 |
| KR | 10-0566795 | 4/2006 |
| KR | 1020060042858 | 5/2006 |
| KR | 1020060069378 | 6/2006 |
| KR | 1020060079784 | 7/2006 |
| KR | 1020060090191 | 8/2006 |
| KR | 10-2006-0131671 | 12/2006 |
| KR | 1020060134058 | 12/2006 |
| KR | 10-0677131 | 2/2007 |

(56) References Cited

FOREIGN PATENT DOCUMENTS

| | | |
|---|---|---|
| KR | 1020070048552 | 5/2007 |
| KR | 10-2007-0073577 | 7/2007 |
| KR | 10-2007-0073588 | 7/2007 |
| KR | 10-2007-0076374 | 7/2007 |
| KR | 10-2008-0085694 | 9/2008 |
| KR | 10-0907978 | 7/2009 |
| KR | 10-2009-0084320 | 8/2009 |
| KR | 10-2009-0084756 | 8/2009 |
| RU | 2304348 | 8/2007 |
| TW | 496058 | 7/2002 |
| WO | 9937114 | 7/1999 |
| WO | 0122645 | 3/2001 |
| WO | 01/24411 | 4/2001 |
| WO | 01/37473 | 5/2001 |
| WO | 01/39386 | 5/2001 |
| WO | 01/67664 | 9/2001 |
| WO | 02/01742 | 1/2002 |
| WO | 02/45453 | 6/2002 |
| WO | 03045103 | 5/2003 |
| WO | 2004/042953 | 5/2004 |
| WO | 2004042963 | 5/2004 |
| WO | 2004042964 | 5/2004 |
| WO | 2004/100537 | 11/2004 |
| WO | 2004/102838 | 11/2004 |
| WO | 2005/022814 | 3/2005 |
| WO | 2005039108 | 4/2005 |
| WO | 2005/078967 | 8/2005 |
| WO | 2005/079105 | 8/2005 |
| WO | 2005/109671 | 11/2005 |
| WO | 2005/122441 | 12/2005 |
| WO | 2005125226 | 12/2005 |
| WO | 2006/009714 | 1/2006 |
| WO | 2006/016785 | 2/2006 |
| WO | 2006/033521 | 3/2006 |
| WO | 2006-046894 | 5/2006 |
| WO | 2006052086 | 5/2006 |
| WO | 2006/075820 | 7/2006 |
| WO | 2006/083149 | 8/2006 |
| WO | 2006095385 | 9/2006 |
| WO | 2006118418 | 9/2006 |
| WO | 2006/104335 | 10/2006 |
| WO | 2006/104342 | 10/2006 |
| WO | 2006/104773 | 10/2006 |
| WO | 2006/116620 | 11/2006 |
| WO | 2006/118435 | 11/2006 |
| WO | 2007/020070 | 2/2007 |
| WO | 2007/023364 | 3/2007 |
| WO | 2007024065 | 3/2007 |
| WO | 2007/045505 | 4/2007 |
| WO | 2007039023 | 4/2007 |
| WO | 2007/052921 | 5/2007 |
| WO | 2007052900 | 5/2007 |
| WO | 2007/066900 | 6/2007 |
| WO | 2007/078155 | 7/2007 |
| WO | 2007/078174 | 7/2007 |
| WO | 2007/079085 | 7/2007 |
| WO | 2007078142 | 7/2007 |
| WO | 2007078156 | 7/2007 |
| WO | 2007078164 | 7/2007 |
| WO | 2007078173 | 7/2007 |
| WO | 2007078174 | 7/2007 |
| WO | 2007/091831 | 8/2007 |
| WO | 2007089797 | 8/2007 |
| WO | 2007091838 | 8/2007 |
| WO | 2007126793 | 11/2007 |
| WO | 2007147431 | 12/2007 |
| WO | 2008/004725 | 1/2008 |
| WO | 2008/010063 | 1/2008 |
| WO | 2008/060097 | 5/2008 |
| WO | 2008/094120 | 8/2008 |
| WO | 2009/035301 | 3/2009 |

OTHER PUBLICATIONS

European Telecommunication Standards Institute (ETSI), "Digital Cellular Telecommunications System (Phase 2+), Functional Stage 2 Description of Location Services (LCS) in GERAN," ETSI Technical Specification, ETSI TS 143 059, V7.3.0, May 2007, XP-014038519.
Texas Instruments, "UL Synchronization Management in LTE_ACTIVE," R1-071478, 3GPP TSG RAN WG1 #48bis, Mar. 2007, XP-050105413.
Texas Instruments, "UL Synchronization Management and Maintenance in E-UTRA," R1-072198, 3GPP TSG RAN WG1 #49, May 2007, XP-050105936.
LG Electronics Inc., "UE State Transition in LTE_ACTIVE," R2-061002, 3GPP TSG RAN WG2 #52, Mar. 2006, XP-050130928.
Ericsson, "Scheduling Request in E-UTRAN," R1-070471, 3GPP TSG RAN WG2 #47bis, Jan. 2007, XP-050104502.
Motorola, "Contention-Free Intra-LTE Handover," R2-070730, 3GPP TSG RAN WG2 #57, Feb. 2007, XP-050133763.
3rd Generation Partnership Project (3GPP); "Technical Specification Group Radio Access Network; Evolved Universal Terrestrial Radio Access (E-UTRA) Medium Access Control (MAC) protocol specification (Release 8)", 3GPP TS 36.321 V1.0.0, Sep. 2007.
Motorola, "MAC Header format", R2-074419, 3GPP TSG-RAN2 Meeting #59bis, Oct. 2007.
NTT DoCoMo, Inc. et al, "MAC PDU structure for LTE", R2-074174, 3GPP TSG RAN WG2 #59bis, Oct. 2007.
3rd Generation Partnership Project (3GPP); "Technical Specification Group Radio Access Network; Medium Access Control (MAC) protocol specification (Release 7)", 3GPP TS 25.321 V7.5.0, Jun. 2007.
"LTE User Plane session report", R2-074536, 3GPP TSG RAN WG2 #59bis, Oct. 2008.
Wang, P.S., "Operation of Control Protocol Data Units in Packet Data Convergence Protocol," U.S. Appl. No. 60/976,139, filed Sep. 28, 2007.
Mukherjee, R.P. "Method and Apparatus of Performing Packet Data Convergence Protocol Reset," U.S. Appl. No. 61/019,058, Jan. 4, 2008.
3rd Generation Partnership Project (3GPP); "Technical Specification Group Radio Access Network; Evolved Universal Terrestrial Radio Access (E-UTRA) Radio Link Control (RLC) protocol specification (Release 8)", 3GPP TS 36.322 V8.0.0, Dec. 2007.
"Miscellaneous corrections to TS 36.322", R2-081700, 3GPP TSG-RAN2 Meeting #61bis, Mar. 2008.
Ericsson, "Clarification to the handling of large RLC status reports", R2-082018, 3GPP TSG-RAN2 Meeting #61bis, Mar. 2008.
LG Electronics Inc. et al., "ACK_SN setting for short STATUS PDU", R2-082133, 3GPP TSG-RAN WG2 #62, May 2008.
QUALCOMM Europe, "Scheduling request mechanism", R1-071276, 3GPP TSG-RAN WG1 #48bis, Mar. 2007.
Texas Instruments, "Scheduling Request and DRX in E-UTRA", R1-072859, 3GPP TSG RAN WG1 #49bis, Jun. 2007.
Nokia Siemens Networks, "Update on Security, System Information, Mobility, MBMS and DRX", R2-073863, 3GPP TSG-RAN2 Meeting #59, Aug. 2007.
Ericsson, "SDU Discard", R2-073230, 3GPP TSG-RAN WG2 #59, Aug. 2007.
Nokia, "Buffer Reporting for E-UTRAN," R2-060829, 3GPP TSG-RAN WG2 Meeting #52, Mar. 2006, XP-002503218.
Nokia, "Uplink Scheduling for VoIP," R2-070476, 3GPP TSG-RAN WG2 Meeting #57, Feb. 2007, XP-008125208.
Rapporteur (ASUSTeK), "Summary of HFN de-synchronization problem off-line email discussion", R2-050318, 3GPP TSG RAN WG2 #46, Feb. 2005.
ASUSTeK, "On-line recovery of HFN synchronization due to RLC UM SN problem", R2-041940, 3GPP TSG-RAN WG2 meeting #44, Oct. 2004.
LG Electronics Inc., "Correction of status report coding," R2-080969, 3GPP TSG RAN WG2 #61, Feb. 2008, XP-002624626.
LG Electronics, "Correction to PDCP Status Report," R2-081594, 3GPP TSG-RAN2 Meeting #61bis, Mar. 2008, XP-002624627.
Alcatel-Lucent, "PDCP status report carrying LIS only," R2-080902, 3GPP TSG RAN WG2 #61, Jan. 2008, XP-050138711.
3rd Generation Partnership Project (3GPP), "Technical Specification Group Radio Access Network; Evolved Universal Terrestrial Radio

(56) References Cited

OTHER PUBLICATIONS

Access (E-UTRA); Packet Data Convergence Protocol (PDCP) specification (Release 8)," 3GPP TS 36.323 V8.2.1, May 2008, XP-050377638.
Qualcomm Europe, "Further Details on RACH Procedure," R1-070649, 3GPP TSG-RAN WG1 #48, Feb. 2007.
NTT DoCoMo, Inc., "Buffer Status Report and Scheduling Request triggers," R2-073574, 3GPP TSG RAN WG2 #59, Aug. 2007.
Ghosh, A., et al.; "Random Access Design for UMTS Air-Interface Evolution", IEEE 65th; Vehicular Technology Conference, 2007; Apr. 22, 2007; pp. 1041-1045.
Sadayuki, Abeta, et al.; "Super 3G Technology Trends Part 2: Research on Super 3G Technology"; NTT DoCoMo Technical Journal, vol. 8, No. 3, pp. 55-62, Dec. 2006.
Nokia; "System Information Distribution"; 3GPP TSG-RAN WG2 Ad Hoc Meeting on LTE; R2-061487; France Jun. 27, 2006.
LG ELectronics; "Delivery of LTE System Information"; 3GPP TSG-RAN WG2 Ad Hoc on LTE; R2-061959; France; Jun. 27, 2006.
NEC; "Optimized Buffer Status Reporting"; 3GPP TSG-RAN WG2; Tdoc: R2-072515; Orlando, Jun. 2007; XP-002503220.
Catt, Ritt; "Consideration on UL Buffer Reporting" 3GPP TSG RAN WG2 #55; Seoul, Korea; Oct. 2006; XP-002513924; R2-062934.
Kashima, T.; "Method and Apparatus for Providing Timing Alignment"; U.S. Appl. No. 60/944,662, filed Jun. 18, 2007.
Lin, L.C.; "Enhanced random access response formats in E-UTRA"; U.S. Appl. No. 61/006,348; Jan. 8, 2008.
Cohen, "An Improved SSCOP-like Scheme for Avoiding Unnecessary Retransmissions and Achieving Ideal Throughput," Proceedings of IEEE INFOCOM Conference on Computer Communications, pp. 855-862, Mar. 1996, XP-010158150.
Motorola, "Synchronized Random Access Channel and Scheduling Request," R1-063046, 3GPP TSG RAN1#47, Nov. 2006.
NTT DoCoMo et al., "Scheduling Request Transmission Method for E-UTRA Uplink," R1-063301, 3GPP TSG RAN WG1 Meeting #47, Nov. 2006.
Ericsson, "Basic Principles for the Scheduling Request in LTE," R2-062350, 3GPP TSG RAN WG2 #54, Aug. 2006.
Ericsson et al., "Framework for Scheduling Request and Buffer Status Reporting," R2-074691, TSG-RAN WG2 Meeting #60, Nov. 2007.
ITRI, "Buffer Status Reporting with Group Combining for LTE", R2-072833, 3GPP TSG-RAN-WG2 Meeting #58bis, Jun. 2007.
NEC, "Considerations on Scheduling Information", R2-073556, 3GPP TSG-RAN WG2#59, Aug. 2007.
"Universal Mobile Telecommunications System (UMTS); Radio Link Control (RLC) protocol specification (3GPP TS 25.322 version 4.10.0 Release 4)", ETSI TS 125 322, Sep. 2003, XP-014016803.
LG Electronics Inc, "Correction to Polling Procedure", R2-081588, 3GPP TSG-RAN WG2 #61bis, Mar. 2008, XP-050139320.
QUALCOMM Europe, "UL requests", R1-070426, 3GPP TSG-RAN WG1 #47bis, Jan. 2007.
ASUSTeK Computer Inc., "HFN de-synchronization detection with Integrity Protection scheme in a wireless communications system", U.S. Appl. No. 60/863,800.
U.S. Appl. No. 12/234,574, Office Action dated Aug. 14, 2013, 18 pages.
QUALCOMM Europe, "L2 improvements and polling," 3GPP TSG-RAN WG2 #58, R2-072021, May 2007, 3 pages.
U.S. Appl. No. 13/431,795, Office Action dated Oct. 4, 2013, 11 pages.
U.S. Appl. No. 13/541,574 Office Action dated Oct. 23, 2013, 6 pages.
Alcatel-Lucent, "Format for RACH Message 2," R2-080176, 3GPP TSG RAN WG2 #60bis, Jan. 1, 2008.
Motorola, "Design of backoff scheme for LTE," R2-070143, 3GPP TSG-RAN-WG2 Meeting #56bis, Jan. 19, 2007.
MAC Rapporteurs (Ericsson, Qualcomm Europe), "E-UTRA MAC protocol specification update," R2-080631, 3GPP TSG-RAN2 Meeting #60bis, Jan. 18, 2008.

In the U.S. Appl. No. 12/671,020, Final Office Action dated Oct. 3, 2012, 40 pages.
State Intellectual Property Office of the People's Republic of China Application Serial No. 200980109358.5, Office Action dated Nov. 26, 2012, 13 pages.
U.S. Appl. No. 13/441,698, Office Action dated Nov. 21, 2012, 9 pages.
U.S. Appl. No. 12/922,538, Office Action dated Nov. 23, 2012, 12 pages.
U.S. Appl. No. 12/452,905, Office Action dated Dec. 3, 2012, 13 pages.
In the U.S. Appl. No. 12/738,625, Non-Final Office Action dated Oct. 24, 2012, 11 pages.
In the U.S. Appl. No. 12/733,179, Non-Final Office Action dated Oct. 31, 2012, 14 pages.
U.S. Appl. No. 12/672,835, Final Office Action dated Dec. 19, 2013, 18 pages.
NTT DoCoMo, Inc., "Uplink Synchronization," 3GPP TSG RAN WG2 #57, R2-070781, XP-002713200, Feb. 2007, 3 pages.
Samsung, "MAC functions: ARQ," 3GPP TSG-RAN2 Meeting #51, Tdoc R2-060374, XP-002488423, Feb. 2006, 5 pages.
European Patent Office Application Serial No. 08793118.4, Search Report dated Dec. 10, 2013, 6 pages.
U.S. Appl. No. 13/107,232, Notice of Allowance dated Jan. 30, 2013, 15 pages.
Motorola, "LTE Random Access Procedure", R2-061463, 3GPP TSG-RAN WG2#53, XP007905045, May 2006, 4 pages.
Ericsson, "Random Access Procedures for LTE", Tdoc R2-060866, Joint RAN1/RAN2 meeting on LTE, Mar. 2006, 7 pages.
MAC Rapporteurs, "Text Proposal for MAC agreements", R2-074531, 3GPP TSG-RAN WG2 #59bis, Aug. 2007, 9 pages.
European Patent Office Application Serial No. 08841080.8, Search Report dated Feb. 14, 2014, 14 pages.
Nokia Corporation, et al., "MAC Header Format", R2-073891, 3GPP TSG-RAN WG2 Meeting #59bis, XP-002602993, Oct. 2007, 5 pages.
European Patent Office Application Serial No. 08842001.3, Search Report dated Feb. 21, 2014, 10 pages.
LG Electronics Inc., "Handling of HFN de-synchronization," 3GPP TSG-RAN WG2 #60, R2-074746, Nov. 2007, 2 pages.
European Patent Office Application Serial No. 08793028.5, Search Report dated Mar. 12, 2014, 7 pages.
U.S. Appl. No. 12/672,999, Final Office Action dated Jun. 6, 2013, 12 pages.
LG Electronics, "Update of eUtran PDCP specification", R2-081390, 3GPP TSG-RAN2 Meeting #61, Jan. 2008.
3rd Generation Partnership Project (3GPP), "3rd Generation Partnership Project; Technical Specification Group Radio Access Network; Radio Link Control (RLC) protocol specification (Release 6)," 3GPP TS 25.322 V6.5.0, Sep. 2005, XP050129441, 79 pages (relevant portions: paragraphs [9.7.1], [11.3.2] and [11.3.2.1.1]).
Zhang, et al., "Performance of UMTS Radio Link Control," Proceedings of IEEE International Conference on Communications, XP010590089, Apr. 2002, 5 pages.
European Patent Office Application Serial No. 08164559.0, Search Report dated Jun. 27, 2013, 8 pages.
3rd Generation Partnership Project (3GPP), "3rd Generation Partnership Project; Technical Specification Group Radio Access Network; Radio Link Control (RLC) protocol specification (Release 7)," 3GPP TS 25.322 V7.3.0, Jun. 2007, XP05367795, 81 pages (relevant portions: sections [4.2.1], [9.5], [9.7.3] and [11.6]).
European Patent Office Application Serial No. 08164607.7, Search Report dated Jul. 12, 2013, 8 pages.
Ericsson, "RLC status report format", R2-074701, TSG-RAN WG2 Meeting #60, Nov. 2007.
LG Electronics, "Resource request in Synchronized Case," TSG-RAN Working Group 2 #52, R2-061018, Mar. 2005, 2 pages.
LG Electronics, "Discussion on Message 4 in Random Access," 3GPP TSG-RAN WG2 #59, R2-073354, Aug. 2007, 4 pages.
Panasonic, "Random access design for E-UTRA uplink," TSG-RAN WG1 Meeting#45, R1-061114, May 2006, 5 pages.

(56) References Cited

OTHER PUBLICATIONS

NTT DoCoMo, "Random Access Channel Structure for E-UTRA Uplink," 3GPP TSG-RAN WG1 and WG2 Joint Meeting, R2-061064, Mar. 2006, 8 pages.
Samsung, "Optimization of contention resolution in RACH," 3GPP TSG-RAN WG2#58bis, R2-072797, Jun. 2007, 3 pages.
Motorola, et al., "E-UTRA Random Access Channel TP from email discussion," 3GPP TSG RAN1#44-bis, R1-060885, Mar. 2006, 6 pages.
Nec, et al., "Need for MAC contention-resolution for non-initial access," 3GPP TSG-RAN WG2 Meeting #59, R2-073092, Aug. 2007, 3 pages.
Ericsson, "Text proposal on scheduling request triggering criterions for LTE," 3GPP TSG-RAN WG2 #59, Tdoc R2-073210, 2 pages.
U.S. Appl. No. 12/733,179, Notice of Allowance dated Mar. 21, 2014, 6 pages.
U.S. Appl. No. 12/452,905, Final Office Action dated Apr. 11, 2013, 20 pages.
Masson, "E-UTRA RACH within the LTE system," XP-002448009, Feb. 2006, 82 pages (relevant pp. 60 and 61).
LG Electronics Inc., "RACH procedure," 3GPP TSG-RAN WG2 #59, R2-073043, XP-002515770, Aug. 2007, 3 pages.
LG Electronics Inc., "Discussion on random access back-off procedure," 3GPP TSG-RAN WG2 #60bis, R2-080189, Jan. 2008, 5 pages.
3rd Generation Partnership Project (3GPP), Technical Specification Group Radio Access Network; Evolved Universal Terrestrial Radio Access (E-UTRA) Medium Access Control (MAC) protocol specification (Release 8), 3GPP TS 36.321 V8.0.0, XP-002520880, Dec. 2007, 23 pages.
European Patent Office Application Serial No. 09151778.9, Search Report dated Jun. 11, 2013, 8 pages.
U.S. Appl. No. 12/672,835, Office Action dated Sep. 11, 2013, 16 pages.
NTT DoCoMo, Inc., "Uplink synchronization maintenance", R2-072014, 3GPP TSG RAN WG2 #58, May 2007, 4 pages, XP50134889.
European Patent Office Application Serial No. 08766423.1, Office Action dated Nov. 5, 2012, 5 pages.
LG Electronics, "Overall control signaling structure for generic LTE TDD," 3GPP TSG RAN WG1 LTE TDD Ad Hoc, R1-071848, Apr. 2007, 4 pages.
Siemens, "Signaling in DL for uplink resource allocation," 3GPP TSG RAN WG1#45, R1-061290, May 2006, 6 pages.
European Patent Office Application Serial No. 08793155.6, Search Report dated Jan. 8, 2014, 10 pages.
Nokia, "System Information Change Indication", R2-071739, 3GPP TSG-RAN WG2 Meeting #57bis, May 2007, 4 pages.
European Patent Office Application Serial No. 08766382.9, Search Report dated Dec. 13, 2013, 7 pages.
European Patent Office Application Serial No. 08832469.4, Search Report dated Dec. 20, 2013, 5 pages.
European Patent Office Application Serial No. 08766415.7 Search Report dated Jan. 2, 2014, 8 pages.
U.S. Appl. No. 12/452,733, Final Office Action dated Jan. 8, 2013, 19 pages.
Korean Intellectual Property Office Application Serial No. 10-2008-0091287, Notice of Allowance dated Apr. 24, 2014, 3 pages.
Universal Mobile Telecommunications System (UMTS), "Radio Resource Control (RRC) protocol specification (3GPP TS 25.331 version 6.6.0 Release 6)," ETSI TS 125 331 V6.6.0, Jun. 2005, 1157 pages.
European Patent Office Application Serial No. 09151792.0, Search Report dated Nov. 7, 2013 8 pages.
Korean Intellectual Property Office Application Serial No. 10-2007-0082382, Notice of Allowance dated Nov. 1, 2013, 2 pages.
U.S. Appl. No. 13/431,795, Notice of Allowance dated Jul. 1, 2014, 7 pages.
U.S. Appl. No. 12/672,835, Final Office Action dated May 9, 2013, 16 pages.
Qualcomm Europe, "General Corrections to RLC," 3GPP TSG-RAN Working Group 2 #22, Tdoc R2-011701, Jul. 2001, 6 pages.
LG Electronics Inc., "Out-of-sequence problem in AM RLC: Discretely discarded SDUs," 3GPP TSG-RAN WG2 Meeting #21, R2-011206, May 2001, 2 pages.
3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321 V8.2.0, May 2008, 33 pages.
ASUSTeK, "Minor corrections to 36.321," 3GPP TSG-RAN WG2 Meeting #67, R2-095152, Aug. 2009, 6 pages.
U.S. Appl. No. 12/733,179, Final Office Action dated Apr. 18, 2013, 21 pages.
Korean Intellectual Property Office Application Serial No. 10-2008-0076181, Notice of Allowance dated Feb. 11, 2015, 2 pages.
Intellectual Property Office of India Application Serial No. 4562/KOLNP/2009, Office Action dated Nov. 7, 2014, 2 pages.
Korean Intellectual Property Office Application Serial No. 2008-0077366, Notice of Allowance dated Nov. 24, 2014, 2 pages.
Intellectual Property Office of India Application Serial No. 4360/KOLNP/2009, Office Action dated Oct. 22, 2014, 2 pages.
The State Intellectual Property Office of the People's Republic of China Application Serial No. 201210332593.2, Office Action dated Sep. 3, 2014, 6 pages.
NTT DoCoMo, Inc., "RA response format," 3GPP TSG RAN WG2 #60bis, R2-080451, Jan. 2008, 2 pages.
European Patent Office Application Serial No. 14177928.0, Search Report dated Sep. 29, 2014, 8 pages.
U.S. Appl. No. 14/203,287, Office Action dated Oct. 24, 2014, 6 pages.
Intellectual Property Office of India Application Serial No. 4312/KOLNP/2009, Office Action dated Oct. 29, 2014, 2 pages.
Intellectual Property Office of India Application Serial No. 4404/KOLNP/2009, Office Action dated Oct. 20, 2014, 1 page.
State Intellectual Property Office of the People's Republic of China Application Serial No. 200980100119.3, Office Action dated Feb. 5, 2013, 14 pages.
CATT, "Notification scheme for system information Change", R2-071870, 3GPP TSG-RAN WG2#58, May 2007, 5 pages.
LG Electronics Inc., "Discussion on BCCH Update", R2-072736, 3GPP TSG-RAN WG2 #58bis, Jun. 2007, 3 pages.
European Patent Office Application Serial No. 08011263.4, Search Report dated Dec. 7, 2012, 8 pages.
U.S. Appl. No. 12/671,020, Notice of Allowance dated Feb. 14, 2013, 11 pages.
U.S. Appl. No. 14/585,710, Office Action dated Apr. 23, 2015, 6 pages.

* cited by examiner

METHOD OF UPDATING REPEATEDLY-TRANSMITTED INFORMATION IN A WIRELESS COMMUNICATION SYSTEM

CROSS-REFERENCE TO RELATED APPLICATIONS

This application is the National Stage filing under 35 U.S.C. 371 of international application No. PCT/KR2008/003420, filed on Jun. 17, 2008, which claims the benefit of earlier filing date and right of priority to Korean patent application No. 10-2007-0082382, filed on Aug. 16, 2007, and also claims the benefit of U.S. provisional application, Ser. No. 60/944,785, filed on Jun. 18, 2007, and Ser. No. 60/945,340, filed on Jun. 20, 2007, the contents of which are all hereby incorporated by reference herein in their entirety.

TECHNICAL FIELD

The present invention relates to a wireless communication system, and more particularly, to a method of updating repeatedly-transmitted information from a network to a user equipment in a wireless communication system.

BACKGROUND ART

In a wireless communication system, a network transmits system information to a user equipment, wherein the system information is necessarily required to allow a user equipment to access the network or perform communication with the network. Since all user equipments, which intend to perform communication with the network, require the latest system information, the network broadcasts system information to the user equipments periodically and repeatedly.

The system information can be divided into information blocks such as a master information block (MIB), a scheduling block (SB), and a system information block (SIB). The MIB includes information related to physical configuration of a corresponding cell, such as a bandwidth. The SB includes transmission information of SIBs, for example, information related to transmission period, etc. The SIB is a set of associated system information. For example, some SIB includes only information related to peripheral cells, and another SIB includes only information of uplink radio channels, which a user equipment uses. When the network transmits system information to the user equipment, the network can transmit information blocks one by one or two or more information blocks simultaneously.

To provide multimedia broadcast/multicast service (hereinafter, abbreviated as "MBMS"), control information transmitted from the network to the user equipment is an example of transmitting the same data from the network to the user equipment like system information. For the MBMS, the network provides MBMS control channel (MCCH) and MBMS traffic channel (MTCH). The MCCH is used to transmit control information for MBMS transmission to the user equipment while the MTCH is used to transmit MBMS data to the user equipment. The MBMS is comprised of one or more sessions, wherein only one session can exist during one time interval. In other words, in case of the MBMS, the channel on which user data are actually transmitted is the MTCH, and the channel on which information required to receive the MTCH is the MCCH. MTCH reception establishment information transmitted through the MCCH, i.e., MCCH information is transmitted periodically and repeatedly for the same reason as that of the system information.

The MBMS is to provide a streaming or background service to a plurality of user equipments by using a downlink dedicated MBMS bearer service. In the network, an MBMS bearer uses a point-to-multipoint wireless bearer service or a point-to-point wireless bearer service.

The MBMS is divided into a broadcast mode and a multicast mode. The MBMS broadcast mode is a service for transmitting multimedia data to all user equipments (UEs) within a broadcast area. The broadcast area refers to a region where the broadcast service is possible. On the other hand, the MBMS multicast mode is a service for transmitting the multimedia data to a specific user equipment group only within a multicast area. The multicast area refers to a region where the multicast service is possible.

A procedure of providing a specific MBMS from a network to a user equipment by using a multicast mode will be described below. First of all, user equipments which desire to receive the MBMS should undergo a subscription procedure.

Subscription refers to establishing a relationship between a service provider and a user equipment. Also, the user equipments which desire to receive the MBMS should receive a service announcement provided by the network. The service announcement refers to providing the user equipments with a list of services to be provided and related information of the services.

Meanwhile, a user equipment which desires to receive the MBMS of the multicast mode should join a multicast group specifically. The multicast group refers to a group of user equipments which receive a specific multicast service, and joining refers to merging with a multicast group to receive the specific multicast service. The user equipment can notify the network through the above joining that it desires to receive specific multicast data. On the other hand, the user equipment which has joined the multicast group can unsubscribe to joining of the multicast group, which is referred to as leaving.

Each user equipment performs the subscription, joining and leaving procedures. The user equipment can perform the subscription, joining, and leaving procedures at any time, such as before data transmission, during the data transmission, or after the data transmission.

The MBMS can be divided into a multi-cell service and a single cell service, wherein the multi-cell service is to provide the same service to a plurality of cells, and the single cell service is to provide the same service to a single cell. The multi-cell service is transmitted through a multicast channel (MCH), and the single cell service is transmitted through a downlink shared channel (DL SCH). If the user equipment receives the multi-cell service through the MCH, the user equipment can receive the same multi-cell service transmitted from various cells by combining in an MBMS single frequency network (MBSFN) mode.

DISCLOSURE OF THE INVENTION

According to the related art, in case of data which a user equipment necessarily desires to receive, such as system information or MCCH information, the network repeatedly transmits the same data. However, such repeated reception of the same data causes a waste of resources of the user equipment and is inefficient.

Accordingly, the present invention is directed to a method of updating repeatedly-transmitted information in a wireless communication system, which substantially obviates one or more problems due to limitations and disadvantages of the related art.

An object of the present invention is to provide a method of updating repeatedly-transmitted information in a wireless communication system, in which radio resources can efficiently be used in the wireless communication system.

Another object of the present invention is to provide a method of updating repeatedly-transmitted information in a wireless communication system, in which only if data repeatedly transmitted from a network are newly updated, a user equipment can receive the updated data.

To achieve these objects and other advantages and in accordance with the purpose of the invention, as embodied and broadly described herein, in one aspect of the present invention, a method of updating repeatedly-transmitted information from a network to a user equipment in a wireless communication system is disclosed. The network transmits an indicator to the user equipment, the indicator indicating that repeatedly-transmitted information has been updated, and transmits the updated repeatedly-transmitted information to the user equipment in accordance with the indicator. The user equipment receives the updated repeatedly-transmitted information only if it receives an indicator from the network, the indicator indicating that the repeatedly-transmitted information has been updated.

The repeatedly-transmitted information is necessarily required such that the user equipment accesses the network or performs communication after accessing the network in the wireless communication system. The repeatedly-transmitted information means information continuously transmitted from the network to the user equipment. Examples of the repeatedly-transmitted information include system information and MCCH information.

According to the embodiments of the present invention, if the same data are repeatedly transmitted to the user equipment in the wireless communication system, the user equipment can efficiently use system resources and its resources while maintaining the latest data.

BRIEF DESCRIPTION OF THE DRAWINGS

FIG. 3A and FIG. 3B are diagrams illustrating a structure of a radio interface protocol between a user equipment (UE) and E-UTRAN, in which FIG. 3A is a schematic view of a control plane protocol and FIG. 3B is a schematic view of a user plane protocol;

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to E-UMTS (Evolved Universal Mobile Telecommunications System).

Figure 1:
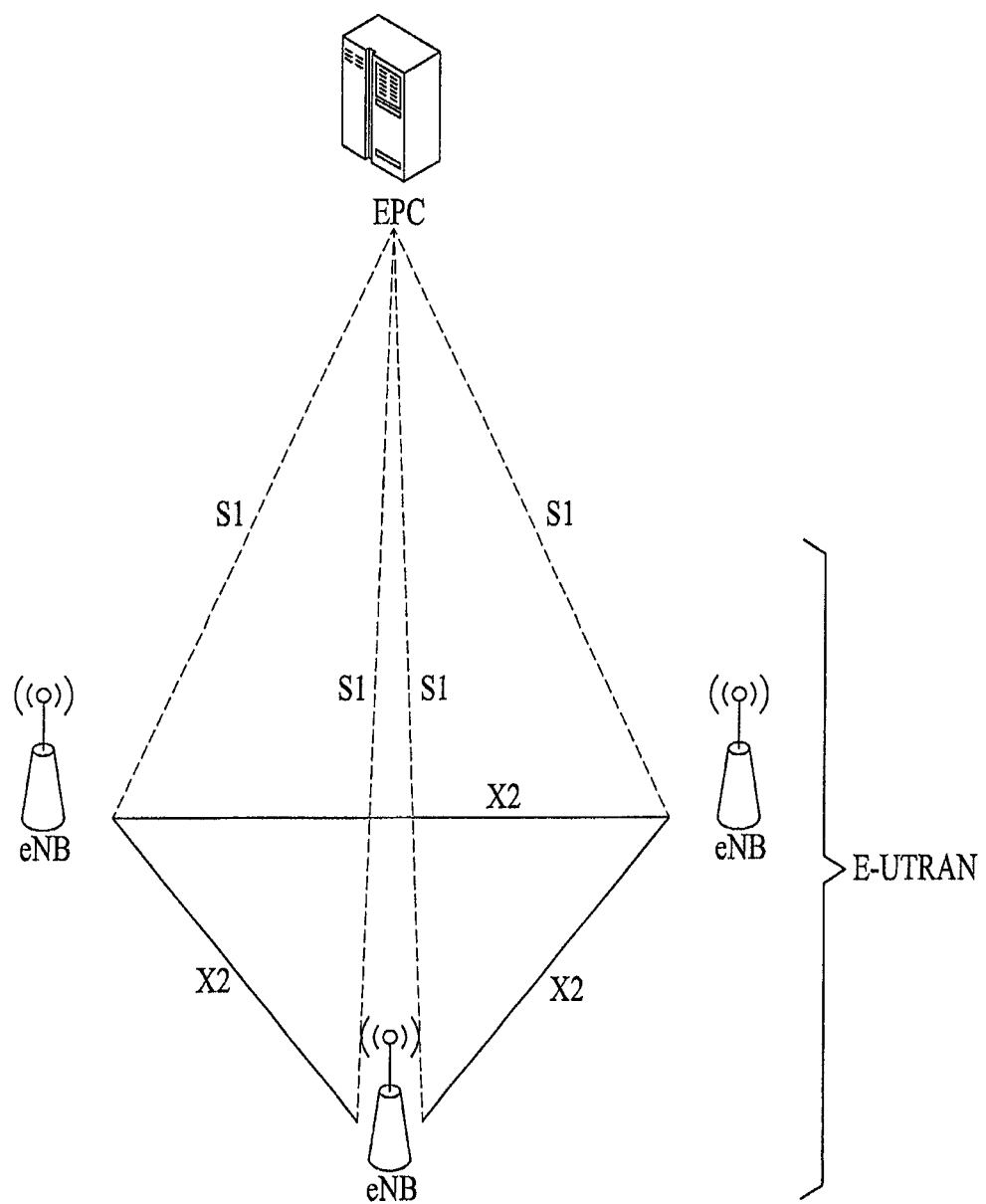
FIG. 1 is a diagram illustrating a network structure of an E-UMTS (Evolved-Universal Mobile Telecommunications System)

FIG. 1 illustrates a network structure of an E-UMTS. An E-UMTS is a system evolving from the conventional WCDMA UMTS and its basic standardization is currently handled by the 3GPP ($3^{rd}$ Generation Partnership Project). The E-UMTS can also be called an LTE (Long Term Evolution) system. Release 7 and Release 8 of ($3^{rd}$ Generation Partnership Project; Technical Specification Group Radio Access Network) can be referred to obtain detailed information about the UMTS and E-UMTS.

Referring to FIG. 1, an E-UTRAN includes base stations (hereinafter, referred to as 'eNode B' or 'eNB'), wherein respective eNBs are connected with each other through X2 interface. Also, each of eNBs is connected with a user equipment (UE) through a radio interface and connected with EPC (Evolved Packet Core) through S1 interface. The EPC includes a mobility management entity/system architecture evolution (MME/SAE) gateway.

Layers of a radio interface protocol between a user equipment (UE) and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') located at the third layer plays a role in controlling radio resources between the UE and the network. For this, the RRC layer enables RRC messages to be exchanged between the UE and the network. The RRC layer can be distributively located at network nodes including Node B, an AG and the like or can be independently located at either the Node B or the AG.

Figure 2:
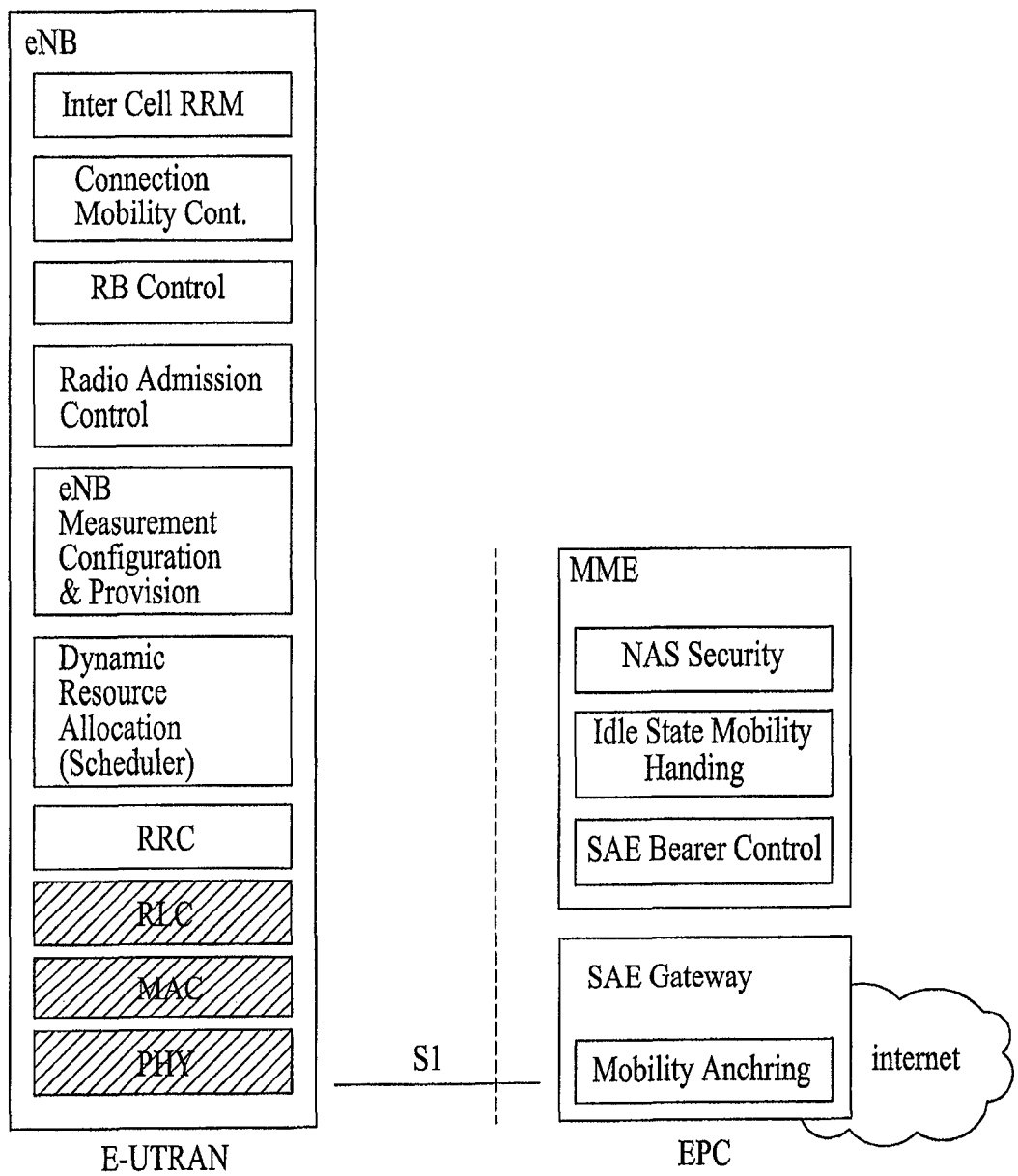
FIG. 2 is a schematic view illustrating an E-UTRAN (Evolved Universal Terrestrial Radio Access Network)

FIG. 2 is a schematic view illustrating an E-UTRAN (UMTS terrestrial radio access network). In FIG. 2, a hatching part represents functional entities of a user plane and a non-hatching part represents functional entities of a control plane.

Figure 3A:
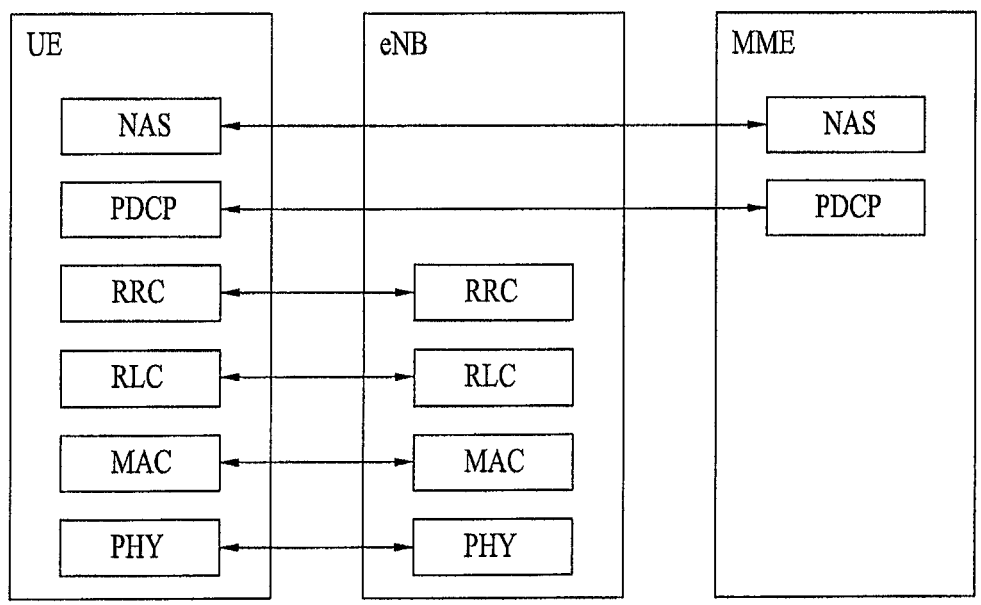
Figure 3B:
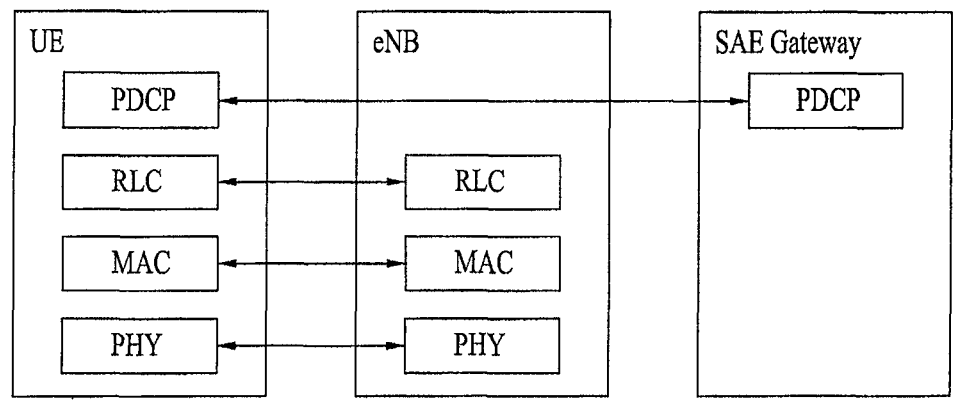

FIG. 3A and FIG. 3B illustrate a structure of a radio interface protocol between the user equipment (UE) and the E-UTRAN, in which FIG. 3A is a schematic view of a control plane protocol and FIG. 3B is a schematic view of a user plane protocol. Referring to FIG. 3A and FIG. 3B, a radio interface protocol horizontally includes a physical layer, a data link layer, and a network layer, and vertically includes a user plane for data information transfer and a control plane for signaling transfer. The protocol layers in FIG. 3A and FIG. 3B can be classified into L1 (first layer), L2 (second layer), and L3 (third layer) based on three lower layers of the open system interconnection (OSI) standard model widely known in the communications systems.

The physical layer as the first layer provides information transfer service to an upper layer using physical channels.

The physical layer (PHY) is connected to a medium access control (hereinafter, abbreviated as 'MAC') layer above the physical layer via transport channels. Data are transferred between the medium access control layer and the physical layer via the transport channels. Moreover, data are transferred between different physical layers, and more particularly, between one physical layer of a transmitting side and the other physical layer of a receiving side via the physical channels. The physical channel of the E-UMTS is modulated in accordance with an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports reliable data transfer. In order to effectively transmit IP packets (e.g., IPv4 or IPv6) within a radio-communication period having a relatively narrow bandwidth, a PDCP layer of the second layer (L2) performs header compression to reduce unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the UE and the UTRAN.

As downlink transport channels carrying data from the network to UEs, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from UEs to the network, there are provided a random access channel (RACH) carrying an initial control message and an uplink shared channel (UL-SCH) carrying user traffic or control message.

As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 4:
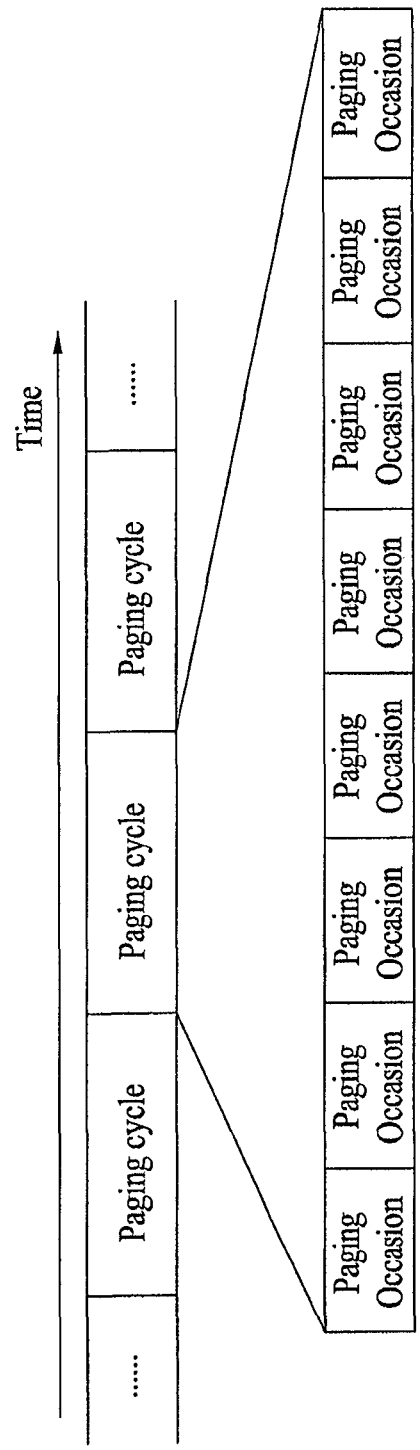
FIG. 4 is a diagram illustrating a method of transmitting a paging channel (PCH) in a UMTS.

FIG. 4 is a diagram illustrating a method of transmitting a paging channel (PCH) in a UMTS. When receiving a paging message, the user equipment can perform discontinuous reception (DRX) for the purpose of power saving. To this end, the network configures several paging occasions per time period called paging DRX cycle, and a specific user equipment receives only a specific paging occasion to acquire the paging message. The user equipment does not receive a paging channel at the time except for the specific paging occasion. One paging occasion corresponds to a transmit time interval (TTI).

In the E-UMTS, an OFDM system is used on the downlink and a single carrier frequency division multiple access (SC-FDMA) system on the uplink. The OFDM system using multiple carriers allocates resources by unit of multiple sub-carriers including a group of carriers and utilizes an orthogonal frequency division multiple access (OFDMA) as an access scheme.

A physical layer of an OFDM or OFDMA system divides active carriers into a plurality of groups and transmits respective groups to different receiving sides. Radio resource allocated to each UE is defined by a time-frequency region on a two-dimensional sphere and is a set of continuous sub-carriers. A time-frequency region in the OFDM or OFDMA system is identified by a rectangular form sectioned by time and sub-carrier coordinates. In other words, one time-frequency region could be identified by a rectangular form sectioned by at least one symbol on a time axis and sub-carriers on a frequency axis. Such a time-frequency region can be allocated to an uplink for a specific UE, or an eNB can transmit the time-frequency region to a specific UE in a downlink. In order to define such a time-frequency region on the two-dimensional sphere, the number of OFDM symbols in the time region and the number of continuous sub-carriers in the frequency region should be given, wherein the continuous sub-carriers start from a point having an offset from a reference point.

The E-UMTS which is currently being discussed uses 10 ms radio frame comprising 20 sub-frames. Namely, a sub-frame has a length of 0.5 ms. A resource block comprises one sub-frame and twelve sub-carriers, each of which is 15 kHz. One sub-frame comprises a plurality of OFDM symbols and a part (for example, first symbol) of the plurality of OFDM symbols can be used for transmission of L1/L2 control information.

Figure 5:
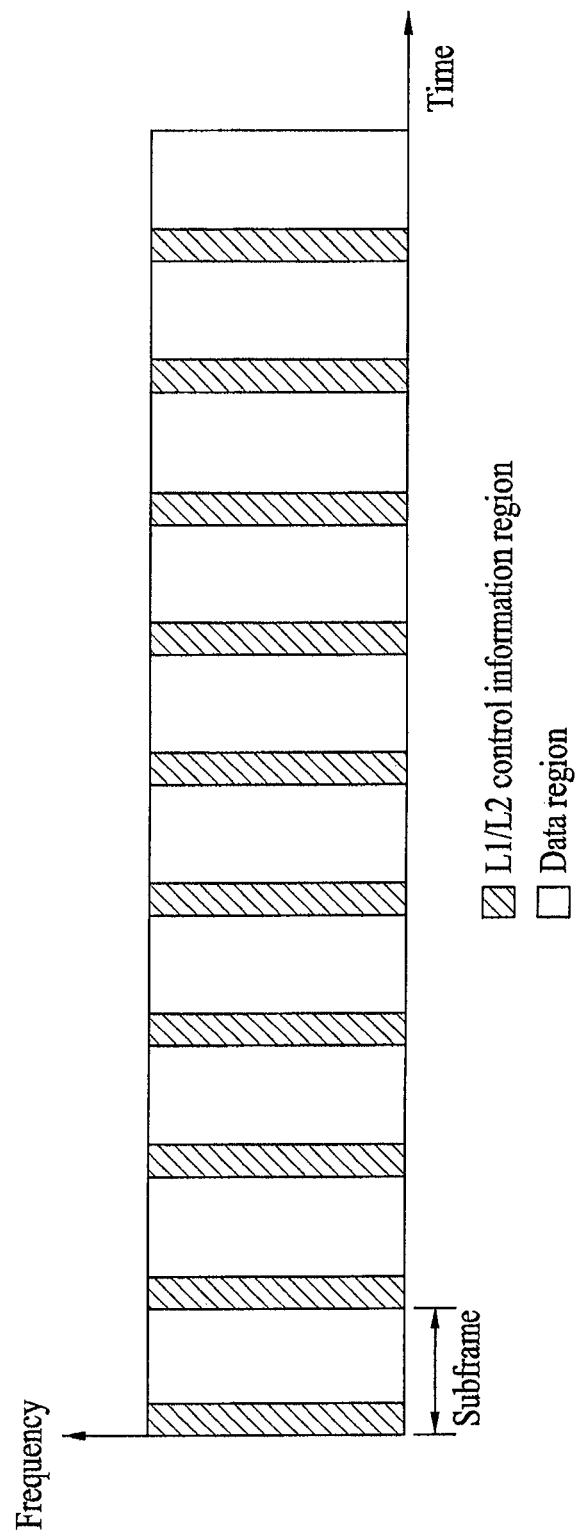
FIG. 5 is a diagram illustrating an example of a physical channel used in an E-UMTS.

FIG. 5 is a diagram illustrating a structure of physical channels used in the E-UMTS. In FIG. 5, a sub-frame comprises an L1/L2 control information transmission region (the hatching part) and a data transmission region (the non-hatching part).

Figure 6:
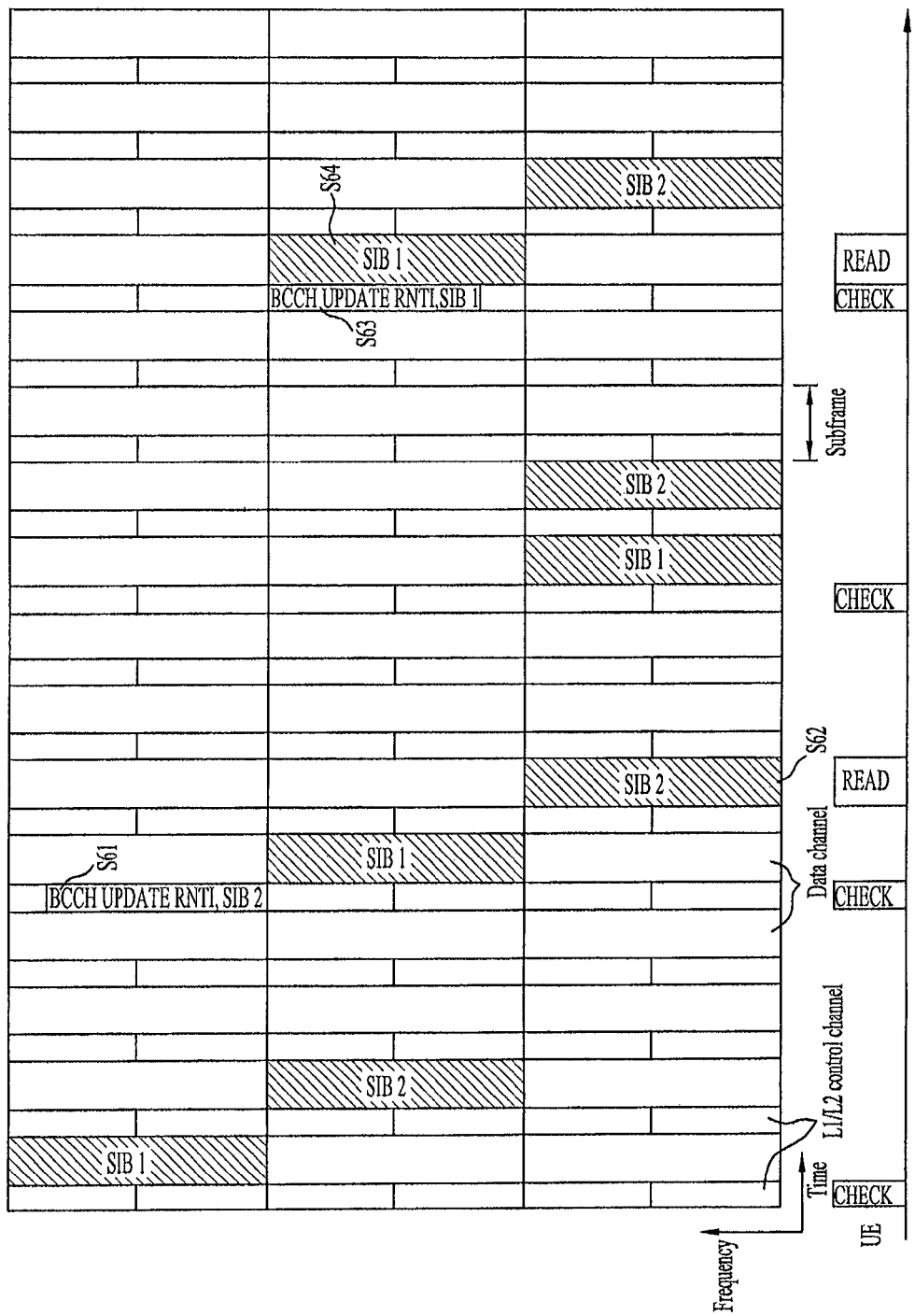
FIG. 6 is a diagram illustrating a frame structure in an E-UMTS according to one embodiment of the present invention.

FIG. 6 is a diagram illustrating a frame structure according to one embodiment of the present invention. In FIG. 6, a vertical axis is a frequency axis where an entire band is divided into three sub-bands.

If the base station needs to update system information, the base station notifies the user equipment that system information will be updated through the L1/L2 control information transmission region and the L1/L2 control channel. In other words, if the system information is updated, the base station transmits system information update identifier to the user equipment through the L1/L2 control channel, wherein the system information update identifier is to notify the user equipment of update of the system.

As described above, the system information includes information blocks such as a master information block (MIB), a scheduling block (SB), and a system information block (SIB). If the network transmits the system information to the user equipment, it can transmit the information blocks one by one, or can transmit two or more information blocks simultaneously. In the embodiment of FIG. 6, the base station transmits system information, i.e., SIB 1 and SIB 2 to the user equipment periodically.

In FIG. 6, the base station transmits control information related to SIB 1 and SIB 2 to the user equipment before transmitting SIB 1 and SIB 2. The control information includes location information of a data region through which SIB 1 and SIB 2 are transmitted. The user equipment receives the L1/L2 control channel periodically. If at least one of SIB 1 and SIB 2 is updated, the base station transmits the system information update identifier to the user equipment through the L1/L2 control channel. In FIG. 6, 'BCCH UPDATE RNTI' is used as the system information update identifier. Preferably, the base station transmits an indicator together with 'BCCH UPDATE RNTI', wherein the indicator is to indicate the updated one of SIB 1 and SIB 2 for the user equipment. For example, if SIB 1 is updated, the base station transmits the indicator for indicating that SIB 1 has been updated, together with 'BCCH UPDATE RNTI' to the user equipment through the L1/L2 control channel (S61). An identifier of the updated SIB can be used as the above indicator. The system information update identifier and the updated SIB identifier can be transmitted together with the control information or can be transmitted separately.

The user equipment receives the L1/L2 control channel per given cycle. If the system information update identifier ('BCCH UPDATE RNTI' in FIG. 6) is received through the L1/L2 control channel, the user equipment determines that the system information has been updated and receives the corresponding system information. If the identifier of the updated SIB is received together with the system information update identifier, the user equipment receives the corresponding SIB. In S61 of FIG. 6, since the user equipment can identify, through 'BCCH UPDATE RNTI,' that the system information has been updated and identify, through 'SIB 2,' that the updated system information is SIB 2, the user equipment does not receive SIB 1 but receives the updated SIB 2 (S62). Since the user equipment can receive 'SIB 1' together with 'BCCH UPDATE RNTI' in S63, the user equipment identifies that SIB 1 has been updated and receives SIB 1 (S64). If the user equipment has received the system information update identifier through the L1/L2 control channel but determines that SIB to be transmitted through the identifier of SIB is not required for the user equipment, the user equipment does not perform the system information update procedure.

In the embodiment of the present invention, the system information update identifier (BCCH UPDATE RNTI) includes allocation information of radio resources through which the updated system information is transmitted. In another aspect of the present invention, the system information update identifier can be transmitted in such a manner that it is divided into BCCH update identifier and BCCH identifier (BCCH reception RNTI). Namely, the BCCH update identifier simply notifies that the system information has been updated while the BCCH identifier is the identifier of the updated SIB. The BCCH identifier can include allocation information of radio resources thruogh which the updated SIB is transmitted. In this case, if the BCCH update identifier is only received, the user equipment reads out all SIBs.

Among the system information blocks, the SB includes scheduling information notifying when the SIB will be transmitted. If contents of the SIB have been updated without change in transmission schedule of the SIBs, the user equipment can directly read out SIB indicated by the system update identifier in accordance with scheduling information indicated by a previous SB as soon as it receives the system information update identifier. At this time, if scheduling information of the updated SIB is updated, the user equipment should read out the SB again. Accordingly, when the SIB has been updated, it is necessary to notify whether scheduling information has been updated. To this end, the system information update identifier can further include scheduling information of the SIB together with the SIB identifier. Alternatively, the system information update identifier can further include SB update identifier, i.e., an identifier for notifying that scheduling information should be read out again or scheduling information has been updated, together with the SIB identifier.

Figure 7:
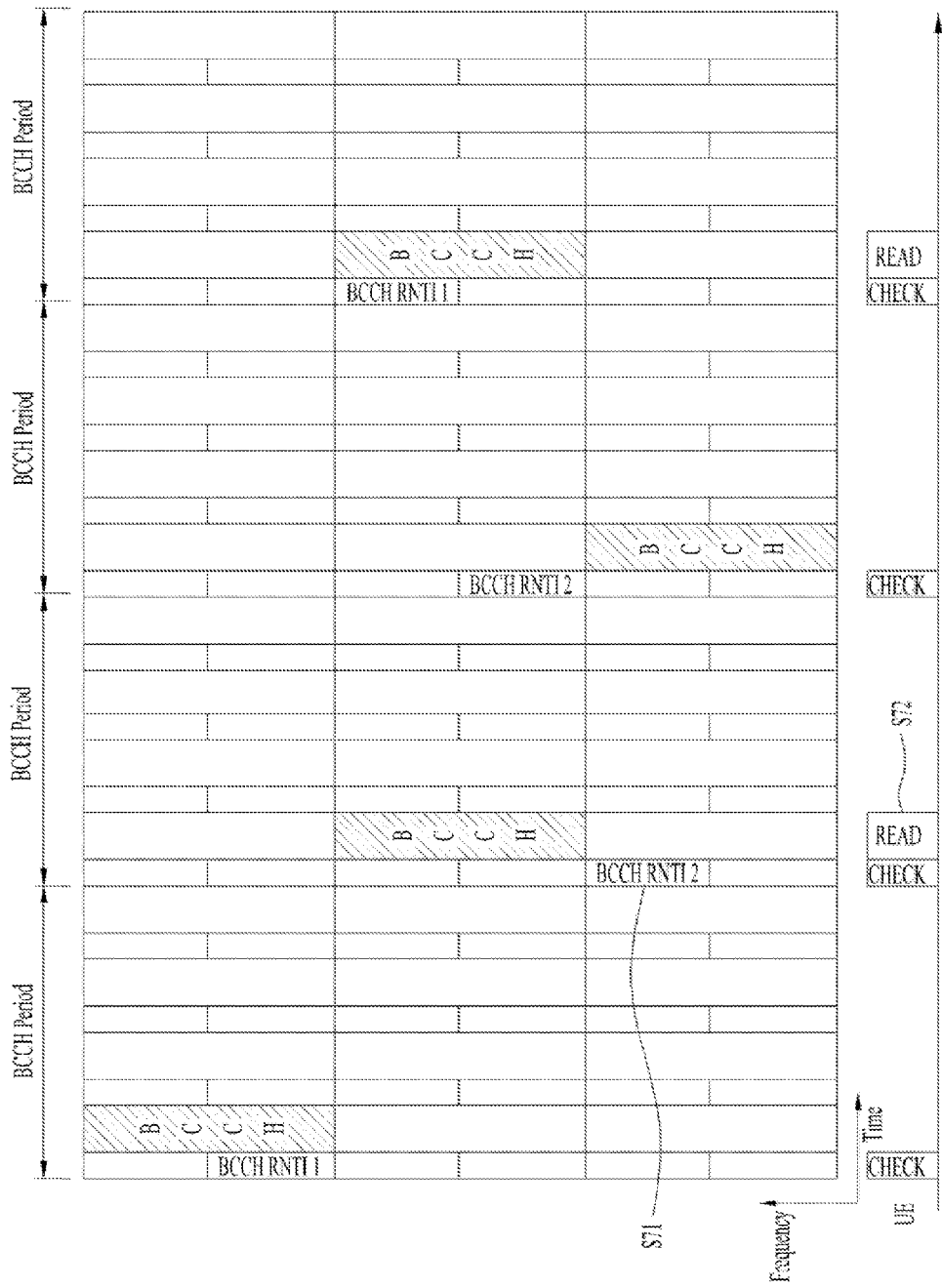
FIG. 7 is a diagram illustrating a frame structure in an E-UMTS according to another embodiment of the present invention.

FIG. 7 is a diagram illustrating a frame structure according to another embodiment of the present invention. In the embodiment of FIG. 7, a plurality of identifiers are allocated for transmission of the system information. If the system information is updated, the base station transmits an identifier different from a previous identifier to the user equipment. If the updated identifier is received through the L1/L2 control channel, the user equipment identifies that the system information has been updated and receives the corresponding system information. In this case, a plurality of information blocks are transmitted as the system information. If only a specific information block of the plurality of information blocks is updated, the base station preferably transmits an indicator such as an identifier of the corresponding information block to the user equipment to notify the updated information block.

Referring to FIG. 7, for BCCH, i.e., system information, the base station allocates two temporary identifiers (RNTI), i.e., BCCH RNTI 1 and BCCH RNTI 2 to the user equipment. The user equipment receives BCCH RNTI 2 through the L1/L2 control channel for a second period (S71). Since BCCH RNTI 2 is different from BCCH RNTI 1 which has been received previously, the user equipment identifies that the system information has been updated and receives BCCH of the corresponding period (S72). Since BCCH RNTI 2 the same as that of the previous period is received for a third period, the user equipment does not receive BCCH. Also, since BCCH RNTI 1 different from BCCH RNTI 2 which has been received previously is received for a fourth period, the user equipment receives BCCH of the corresponding period.

Figure 8:
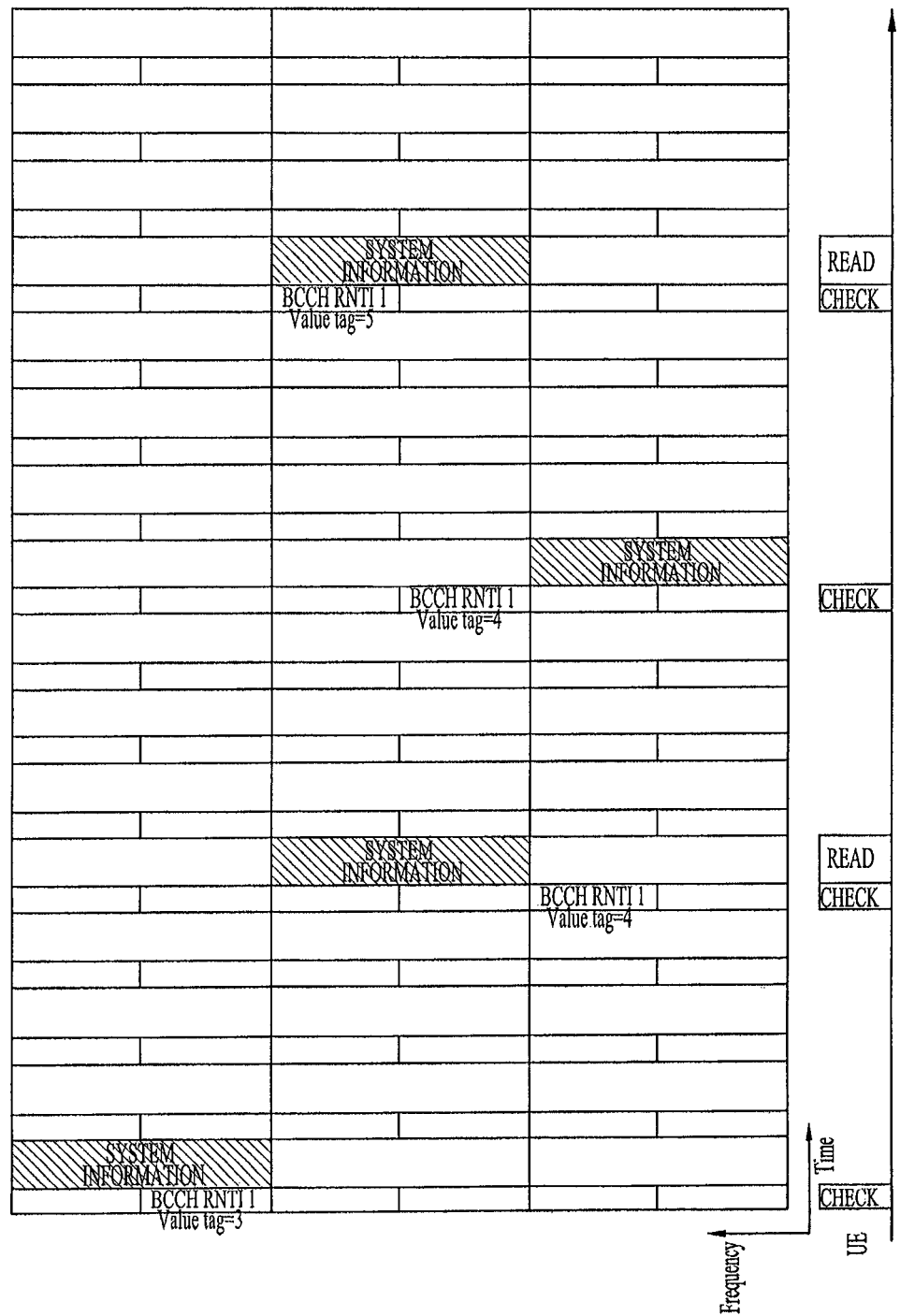
FIG. 8 is a diagram illustrating a frame structure in an E-UMTS according to still another embodiment of the present invention.

FIG. 8 is a diagram illustrating a frame structure according to another embodiment of the present invention. In the embodiment of FIG. 8, it is identified, through 'VALUE TAG,' that the system information has been updated. In other words, the base station transmits the identifier BCCH RNTI of the system information through the L1/L2 control channel before transmitting the system information. At this time, the base station transmits 'VALUE TAG' together with BCCH RNTI. If the system information is updated, the user equipment updates 'VALUE TAG' In FIG. 8, since 'VALUE TAG' value transmitted together with BCCH RNTI is different from that the previous value in the second and fourth transmission periods, the user equipment receives the system information of the corresponding periods.

Figure 9:
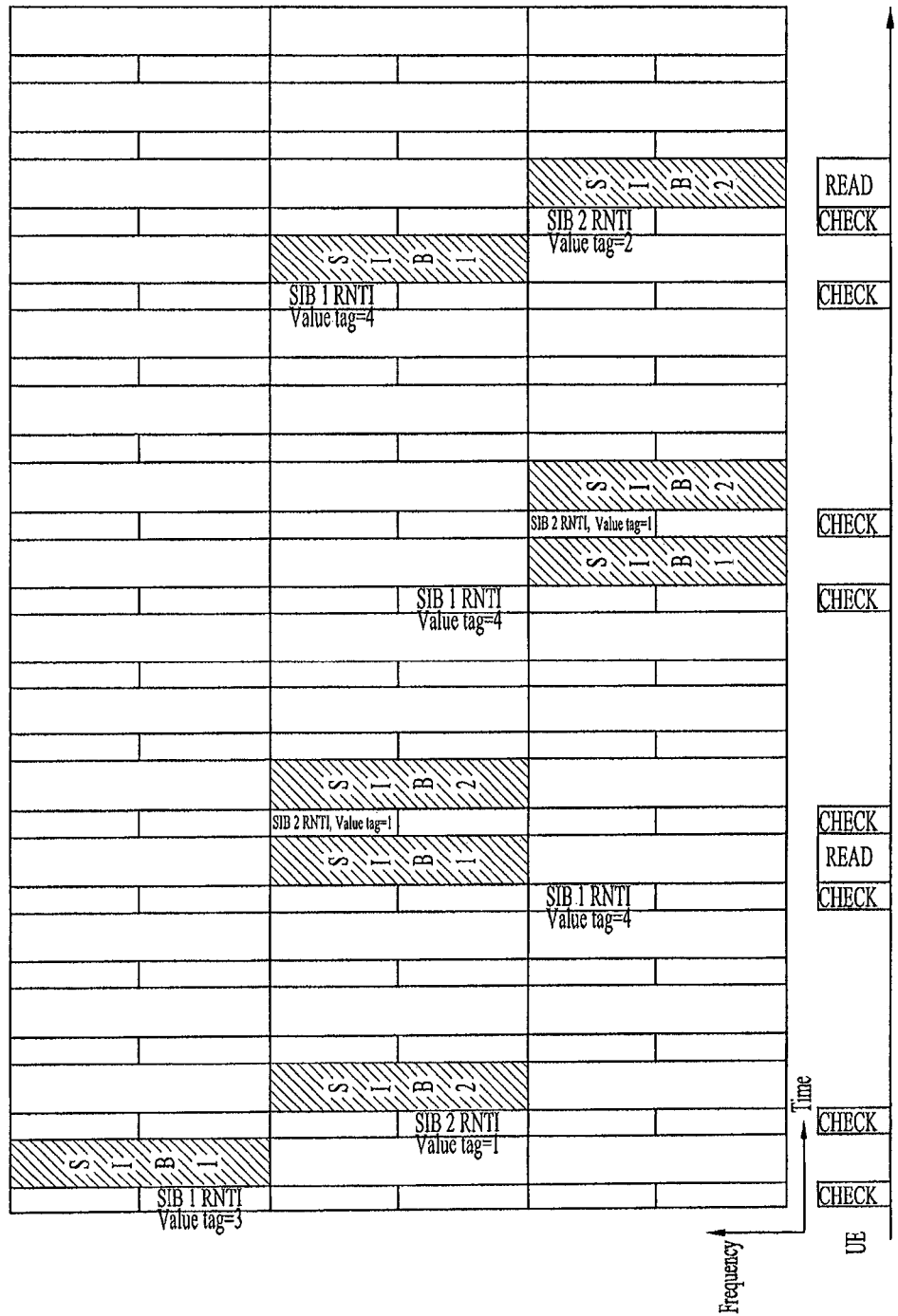
FIG. 9 is a diagram illustrating a frame structure in an E-UMTS according to further still another embodiment of the present invention.

FIG. 9 is a diagram illustrating a frame structure according to another embodiment of the present invention. In the embodiment of FIG. 9, each information block (ex, SIB) constituting system information has a unique identifier. The identifier is a fixed value or a value notified from the base station to the user equipment if necessary. For example, the base station can notify the user equipment of the identifier of each SIB through the MIB. The base station transmits the SIB identifier through the L1/L2 control channel and also transmits 'VALUE TAG' information together with the SIB identifier. At this time, if the SIB is updated, the base station updates the 'VALUE TAG' value and transmits the updated value to the user equipment. If the SIB identifier is received, the user equipment, which is receiving the L1/L2 control channel, receives the 'VALUE TAG' value received together with the SIB identifier. If the 'VALUE TAG' value received together with the SIB identifier is different from a previous 'VALUE TAG' value of the same SIB identifier, the user equipment receives SIB corresponding to the SIB identifier. If the 'VALUE TAG' value received together with the SIB identifier is identical with a previous 'VALUE TAG' value of the same SIB identifier, the user equipment does not receive the SIB.

In FIG. 9, for the first transmission period, the base station transmits 'VALUE TAG=3' to the user equipment through the L1/L2 control channel together with an identifier of SIB 1 (SIB 1 RNTI) so as to notify transmission of SIB 1, and transmits an identifier of SIB 2 (SIB 2 RNTI) and 'VALUE TAG=4' so as to notify transmission of SIB 2. For the second transmission period, since 'VALUE TAG=4' received together with SIB 1 RNTI is different from the previously received value (VALUE TAG=3), the user equipment identifies that SIB 1 has been updated and receives SIB 1 for the corresponding period. Since 'VALUE TAG=1' of SIB 2 received for the second transmission period is identical with 'VALUE TAG' of the previously received SIB 2, the user equipment does not receive SIB 2 for the corresponding period. Since 'VALUE TAG' value of SIB 1 and SIB 2 received for the third transmission period is identical with the previously received value, the user equipment does not receive SIB 1 and SIB 2 for the corresponding period. Since 'VALUE TAG' value ('4') of SIB 1 received through the L1/L2 control channel for the fourth transmission period is identical with the previously received value ('4') and 'VALUE TAG' value ('2') of SIB 2 is different from the previously received value ('1'), the user equipment receives only SIB 2 for the corresponding period.

In the embodiments of the present invention, the base station can notify the user equipment of information, which is related to the time when the updated system information is transmitted, through the L1/L2 control channel. In other words, the base station can notify that the updated system information is transmitted after the lapse of a predetermined time from the time when the information is transmitted, or can notify that the updated system information is transmitted after how long time passes from a given reference time such as absolute time reference or system frame number. In this case, the user equipment starts to receive the updated system information at the time identified by the information transmitted through the L1/L2 control channel.

Figure 10:
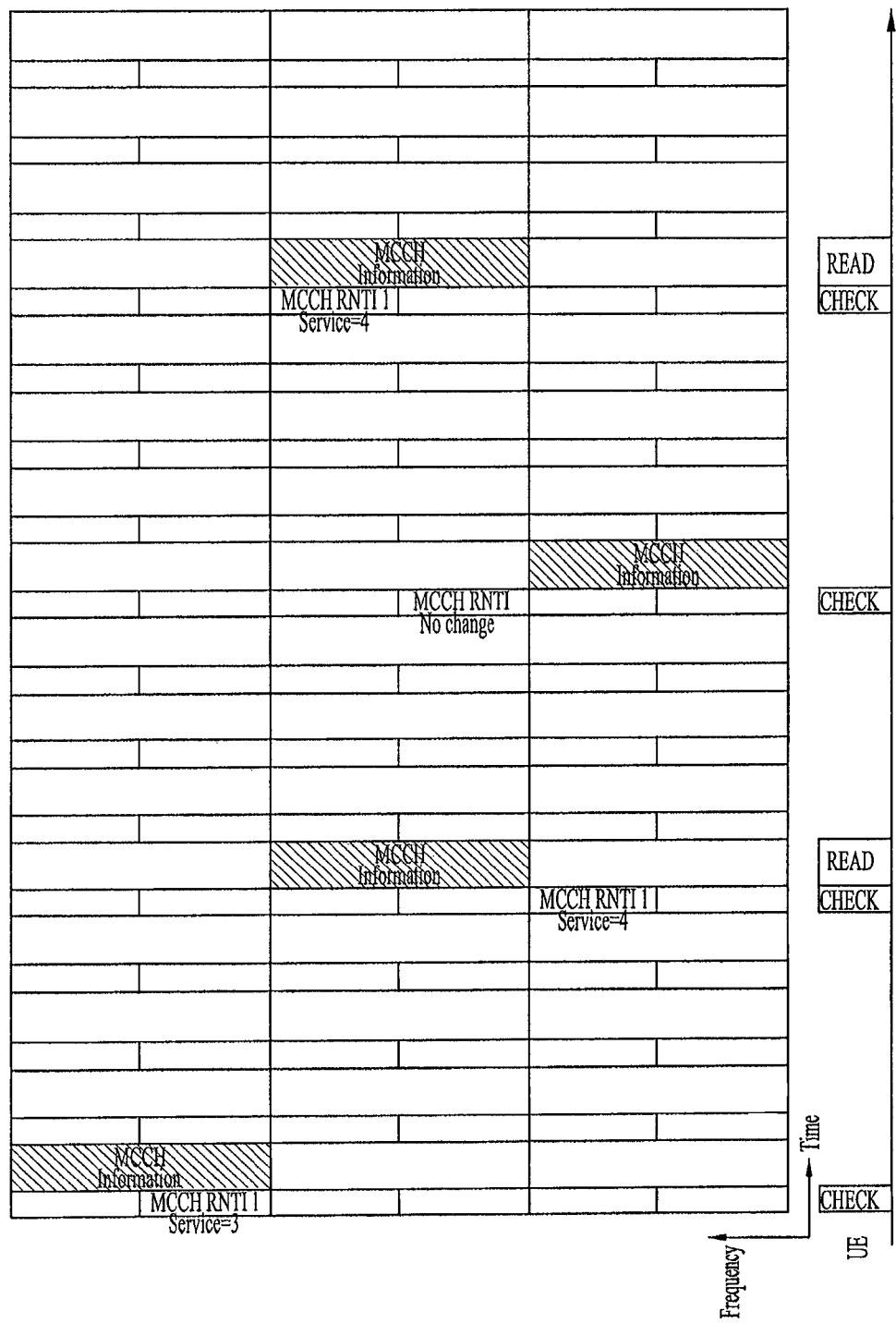
FIG. 10 is a diagram illustrating a frame structure in an E-UMTS according to further still another embodiment of the present invention.

FIG. 10 is a diagram illustrating a frame structure according to another embodiment of the present invention. In the embodiment of FIG. 10, when the base station transmits information, which is required to receive MBMS data through the MTCH, through the MCCH, it notifies the user equipment that MCCH information has been updated.

If a plurality of MBMSs are provided from one cell, the base station notifies the user equipment that MCCH information has been updated, using MCCH update identifier (MCCH RNTI). At this time, it is preferable that the base station transmits an identifier of a service of which MCCH information has been updated, together with the MCCH update identifier, so that only the user equipments which receive the service can receive the updated MCCH information. The user equipment receives the MCCH update identifier and the service identifier through the L1/L2 control channel. If the service identifier is the one of the service that the user equipment has received or will receive, the user equipment receives the updated MCCH information. If not so, the user equipment does not receive the updated MCCH information.

In FIG. 10, it is assumed that the user equipment has been subscribed to MBMS having service ID of '4'. Since the service ID received together with the MCCH update identifier (MCCH RNTI) for the first transmission period is '3', the user equipment does not perform update of the MCCH information. Since the service ID received together with the MCCH update identifier (MCCH RNTI) for the second transmission period is '4', the user equipment receives MCCH to update the MCCH information of the corresponding period.

The MCCH update identifier can notify that the MCCH has been updated and at the same time include allocation information of radio resources through which the MCCH is transferred. The identifier can be divided into MCCH update identifier (MCCH RNTI or MCCH update RNTI) and MCCH identifier (MCCH reception RNTI). At this time, the MCCH update identifier simply notifies that the MCCH information has been updated and additionally notifies the updated service information. The MCCH identifier is used to notify allocation information of radio resources through which the MCCH is actually transferred. If the MCCH update identifier is only received without MBMS service identifier, the user equipment always reads out the MCCH.

Figure 11:
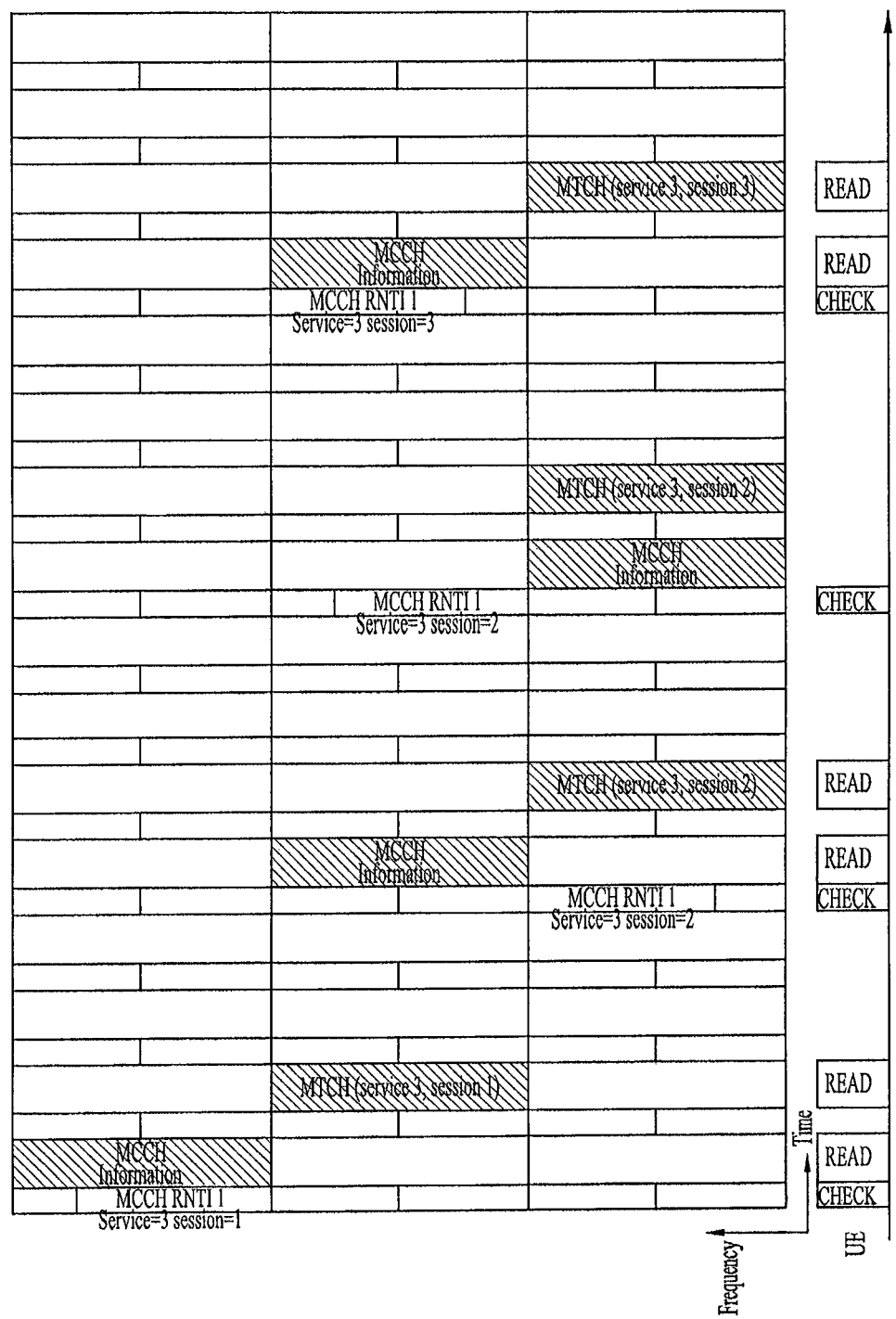
FIG. 11 is a diagram illustrating a frame structure in an E-UMTS according to further still embodiment of the present invention.

FIG. 11 is a diagram illustrating a frame structure according to another embodiment of the present invention.

A specific MBMS includes several sessions, wherein the same session can repeatedly be broadcasted several times. At this time, it is preferable that if the previously received session is broadcasted again, the user equipment does not receive the repeated session. To this end, in the embodiment of FIG. 11, the MCCH update identifier, the service identifier, and a session identifier are transmitted through the L1/L2 control channel.

In FIG. 11, it is assumed that the user equipment has been subscribed to MBMS having service ID of '3'. For the first transmission period, the user equipment receives 'service ID=3' and 'session ID=1' together with the MCCH update identifier (MCCH RNTI) through the L1/L2 control channel. The user equipment receives the updated MCCH information and MTCH data for the corresponding period. Likewise, for the second transmission period, the user equipment receives MCCH RNTI, 'service ID=3' and 'session ID=2' through the L1/L2 control channel. Also, the user equipment receives the updated MCCH information and MTCH data for the corresponding period. For the third transmission period, the user equipment receives MCCH RNTI, 'service ID=3' and 'session ID=2' through the L1/L2 control channel. Since the session ID received for the third transmission period is identical with that received for the second transmission period, the user equipment does not need to repeatedly receive the same data for the corresponding period. Accordingly, the user equipment does not receive the MCCH and the MTCH. Since the session ID transmitted through the L1/L2 control channel has been updated for the fourth transmission period, the user equipment receives the updated MCCH information and MTCH data for the corresponding period.

According to another embodiment of the present invention, a method of allocating one identifier to each MBMS service by combining MCCH update identifier with service identifier can be considered. In other words, separate MCCH update identifier (MBMS RNTI) can be given to each MBMS service provided from one cell and then can be transmitted to the user equipment through the L1/L2 control channel. In this case, the user equipment can receive MBMS RNTI, and can identify a desired service through the received MBMS RNTI and whether to receive the updated MCCH information for the corresponding period. At this time, the base station can transmit session ID together with MBMS RNTI.

In the embodiments of the present invention, if MCCH information of a specific MBMS is updated, the base station can notify the reason why the MCCH information is updated, through the L1/L2 control channel. For example, if the MCCH information is updated, it means that the specific MBMS starts or is cancelled, or the number of receivers is counted. If the MCCH information is updated to notify cancellation of the specific MBMS, it is sufficient that the user equipment is notified to cancel the MBMS. Under the circumstances, if the user equipment reads out the MCCH, it may mean that a battery is unnecessarily consumed. In this case, the base station transmits a service identifier of a specific MBMS through the L1/L2 control channel and notifies that the MBMS will be cancelled. As a result, the user equipment can be operated more efficiently.

If an indicator indicating that the MCCH information has been updated is received through the L1/L2 control channel or if an identifier of a desired MBMS is received, the user equipment receives the reason why the transmitted MCCH information has been updated or current service state information. If the received information indicates that the user equipment will receive MCCH information, the user equipment receives the MCCH information.

Figure 12:
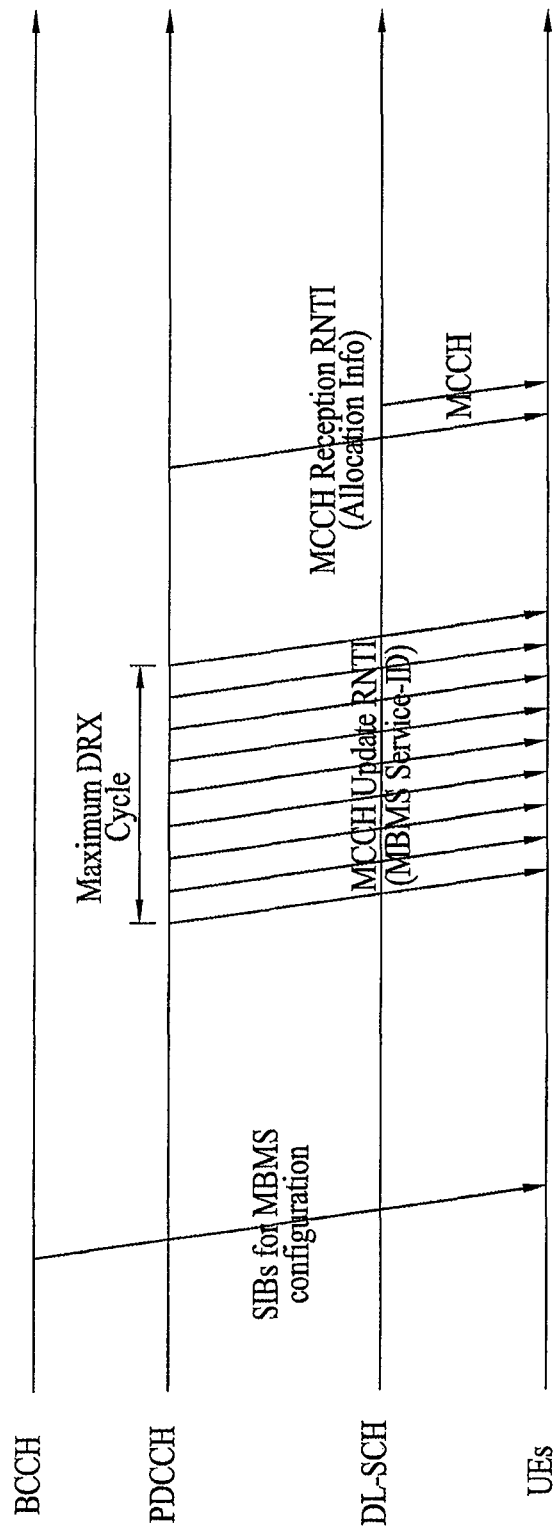
FIG. 12 is a diagram illustrating another embodiment of the present invention.

FIG. 12 is a diagram illustrating a frame structure according to another embodiment of the present invention.

In the embodiments of the present invention, if an identifier indicating that system information or MCCH information has been updated is received through the L1/L2 control channel, the user equipment can receive system information and MCCH information through a designated region at the previously set time. At this time, the identifier transmitted through the L1/L2 control channel to notify updated of system information or MCCH information may be different from the identifier transmitted through the L1/L2 control channel to actually transmit system information or MCCH information. Also, for efficient reception of the user equipment, the identifier indicating update of system information or MCCH information may be transmitted only at the previously set time or in the time-frequency region.

For example, the MCCH update identifier may separately be identified from the MCCH identifier. Namely, the MCCH update identifier can be transmitted to notify the user equipment that MCCH has been updated, and the MCCH identifier can be used to transmit allocation information of radio resources through which the MCCH is actually transmitted. In this case, if the MCCH update identifier is received, the user equipment recognizes that the contents of the MCCH have been updated. Subsequently, the user equipment receives the MCCH through the radio resources indicated by the MCCH identifier.

The user equipment receives MBMS related information through the SIB. The MBMS related information includes the MCCH update identifier and MCCH identifier (MCCH reception RNTI). The user equipment receives the L1/L2 control channel (PDCCH in FIG. 12) for a previously defined time period. If the MCCH update identifier is received through the L1/L2 control channel, the user equipment determines MBMS service ID included in the MCCH update identifier. If the MBMS service ID corresponds to a service to which the user equipment has been subscribed, the user equipment additionally receives MCCH. At this time, the user equipment additionally receives the MCCH identifier, and receives MCCH transferred to radio resources indicated by the MCCH identifier.

One BCCH update RNTI can be allocated for update of all SIBs, and one MCCH update identifier can be allocated for update of all MBMSs. In this case, if there are various kinds of SIBs or MBMSs in one cell, a problem may occur in that the BCCH UPDATE RNTI or MCCH update identifier is transmitted frequently. Accordingly, SIBs can be allocated to several BCCH UPDATE RNTIs. For example, update of SIBs 1, 2, 3 can be notified using 'BCCH UPDATE RNTI 1' and update of SIBs 4, 5, 6 can be notified using 'BCCH UPDATE RNTI 2'. Likewise, update of MBMSs 1, 2, 3 can be notified using 'MCCH update identifier 1' and update of MBMSs 4, 5, 6 can be notified using 'MCCH update identifier 2'. In this way, one MCCH update identifier can be prevented from being used frequently.

If SIB and MBMS are grouped and managed for the unit of group as above, the SIB identifier or the MBMS service identifier may not be transmitted together with BCCH UPDATE RNTI or MCCH update identifier. Namely, if the MCCH update identifier 2 is received, all user equipments subscribed to the MBMSs 4, 5, 6 read out MCCH. Likewise, if the BCCH UPDATE RNTI 2 is received, the corresponding user equipments read out SIB 4, 5, 6 again.

In such case, mapping relation between SIBs and BCCH UPDATE RNTIs, mapping relation between MCCH update identifiers and MBMSs, or grouping information can be notified through system information, etc.

The embodiments of the present invention have been described based on the data transmission and reception between the base station and the user equipment. In this case, the base station means a terminal node of a network, which performs direct communication with the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the random access method in the wireless communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of processing data in a wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used in a wireless communication system such as a mobile communication system or a wireless Internet system.

The invention claimed is:

1. A method for updating information repeatedly-transmitted from a network to a user equipment in a wireless communication system, the method comprising:
   transmitting control information to the user equipment, the control information including a first indicator indicating that the repeatedly-transmitted information has been updated; and
   transmitting the updated repeatedly-transmitted information to the user equipment according to the control information,
   wherein the repeatedly-transmitted information is system information including at least one information block,
   wherein the system information is transmitted through a Broadcast Control Channel (BCCH) that is a logical channel,
   wherein the first indicator is a BCCH update Radio Network Temporary Identifier (RNTI),
   wherein the updated repeatedly-transmitted information is received by the user equipment when the user equipment identifies that the repeatedly-transmitted information has been updated by determining that the first indicator in the control information is different from a previously received first indicator, and
   wherein, if a specific information block of the at least one information block is updated, the control information further includes a second indicator indicating that the specific information block has been updated and the previously received first indicator is selected from among a plurality of previous first indicators by using the second indicator.

2. The method of claim 1, wherein the control information is transmitted through a first layer/second layer (L1/L2) control channel.

3. The method of claim 1, wherein:
   the first indicator is one of a plurality of identifiers; and
   the one of the plurality of identifiers is different from another identifier for previous repeatedly-transmitted information.

4. The method of claim 3, wherein the control information further includes a repeatedly-transmitted information identifier identifying the repeatedly-transmitted information.

5. The method of claim 1, wherein the control information further includes an identifier of the at least one information block included in the system information.

6. The method of claim 5, wherein:
   the first indicator is one of a plurality of identifiers; and
   the one of the plurality of identifiers is different from another identifier for previous repeatedly-transmitted information.

7. The method of claim 1, wherein the control information further includes information associated with a time when the system information is transmitted.

8. The method of claim 1, wherein the control information further includes information associated with a time-frequency region through which the system information is transmitted.

9. A method for updating information repeatedly-transmitted from a network to a user equipment in a wireless communication system, the method comprising:
   receiving control information including a first indicator indicating that the repeatedly-transmitted information has been updated; and
   receiving the updated repeatedly-transmitted information in the user equipment when the user equipment identifies that the repeatedly-transmitted information has been updated by determining that the first indicator in the control information is different from a previously received first indicator, wherein the repeatedly-transmitted information is system information including at least one information block,
   wherein the system information is transmitted through a Broadcast Control Channel (BCCH) that is a logical channel,
   wherein the first indicator is a BCCH update Radio Network Temporary Identifier (RNTI),
   wherein, if a specific information block of the at least one information block is updated, the control information further includes a second indicator indicating that the specific information block has been updated, and
   wherein the previously received first indicator is selected from among a plurality of previously received first indicators by using the second indicator.

10. The method of claim 9, wherein the control information is transmitted through a first layer/second layer (L1/L2) control channel.

11. The method of claim 9, wherein:
    the first indicator is one of a plurality of identifiers; and
    the one of the plurality of identifiers is different from an identifier for previous repeatedly-transmitted information.

12. The method of claim 11, wherein the control information further includes a repeatedly-transmitted information identifier identifying the repeatedly-transmitted information.

13. The method of claim 9, wherein the control information further includes an identifier of the at least one information block included in the system information.

14. The method of claim 13, wherein:
    the first indicator is one of a plurality of identifiers; and
    the one of the plurality of identifiers is different from an identifier for previous repeatedly-transmitted information.

15. The method of claim 9, wherein the control information further includes information associated with a time when the system information is transmitted.

16. The method of claim 9, wherein the control information further includes information associated with a time-frequency region through which the system information is transmitted.

* * * * *